US010942885B2

(12) United States Patent
Takahashi et al.

(10) Patent No.: US 10,942,885 B2
(45) Date of Patent: Mar. 9, 2021

(54) COMMUNICATING APPARATUS, COMMUNICATION METHOD, PROGRAM, AND COMMUNICATION SYSTEM

(71) Applicant: Sony Semiconductor Solutions Corporation, Kanagawa (JP)

(72) Inventors: Hiroo Takahashi, Kanagawa (JP); Takashi Yokokawa, Kanagawa (JP); Toshihisa Hyakudai, Kanagawa (JP); Naohiro Koshisaka, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 9 days.

(21) Appl. No.: 16/482,637

(22) PCT Filed: Jan. 31, 2018

(86) PCT No.: PCT/JP2018/003063
§ 371 (c)(1),
(2) Date: Jul. 31, 2019

(87) PCT Pub. No.: WO2018/150868
PCT Pub. Date: Aug. 23, 2018

(65) Prior Publication Data
US 2020/0012612 A1 Jan. 9, 2020

(30) Foreign Application Priority Data
Feb. 14, 2017 (JP) .............................. JP2017-024940

(51) Int. Cl.
*G06F 13/40* (2006.01)
*G06F 13/36* (2006.01)
(Continued)

(52) U.S. Cl.
CPC .......... *G06F 13/4081* (2013.01); *G06F 13/36* (2013.01); *G06F 13/4291* (2013.01)

(58) Field of Classification Search
CPC ........ H04L 65/10; H04B 7/26; H04W 76/023; H04W 76/00
See application file for complete search history.

(56) References Cited

U.S. PATENT DOCUMENTS

2001/0052041 A1* 12/2001 Gehring ............. G05B 19/0421
710/100
2002/0072392 A1* 6/2002 Awater ................. H04B 7/0615
455/561
(Continued)

FOREIGN PATENT DOCUMENTS

GB 2403315 A 12/2004
JP 2000-099448 A 4/2000
(Continued)

OTHER PUBLICATIONS

Extended European Search Report dated Jan. 15, 2020 for European Application No. 18754893.8.

*Primary Examiner* — Getente A Yimer
(74) *Attorney, Agent, or Firm* — Michael Best & Friedrich LLP

(57) ABSTRACT

This disclosure relates to a communicating apparatus, a communication method, a program, and a communication system that each enable execution of more reliable communication.
A communicating apparatus includes a transmitting and receiving part that executes transmission and reception of signals with at least one or more other communicating apparatuses through a data signal line and a clock signal line, and an error avoiding part that, in a state where a communication system configured to be able to execute communication through a bus already operates, executes a process of avoiding occurrence of any error occurring when a commu-
(Continued)

nicating apparatus is additionally connected to the communication system. This technique is applicable to, for example, a bus IF.

17 Claims, 14 Drawing Sheets

(51) Int. Cl.
   *G06F 13/42* (2006.01)
   *G06F 11/00* (2006.01)
   *G06F 11/07* (2006.01)
   *G06F 3/00* (2006.01)

(56) References Cited

U.S. PATENT DOCUMENTS

| | | | |
|---|---|---|---|
| 2002/0186789 A1* | 12/2002 | Preishuber-Pfluegl | ...................... G06K 7/10861 375/316 |
| 2003/0174658 A1* | 9/2003 | Kuo | ...................... H04L 1/0079 370/277 |
| 2010/0229046 A1* | 9/2010 | Fuehrer | ...................... G06F 9/546 714/43 |
| 2015/0063337 A1* | 3/2015 | Kang | ...................... G06F 13/385 370/338 |
| 2015/0309960 A1 | 10/2015 | Pitigoi-Aron et al. | |
| 2016/0374135 A1* | 12/2016 | Martin | ...................... H04W 72/04 |

FOREIGN PATENT DOCUMENTS

| | | | |
|---|---|---|---|
| JP | 2002-175269 A | 6/2002 | |
| WO | 2014/155721 A1 | 10/2014 | |

\* cited by examiner

COMMUNICATING APPARATUS, COMMUNICATION METHOD, PROGRAM, AND COMMUNICATION SYSTEM

TECHNICAL FIELD

The present disclosure relates to a communicating apparatus, a communication method, a program, and a communication system and particularly to a communicating apparatus, a communication method, a program, and a communication system that are each adapted to be able to further reliably execute communication.

BACKGROUND ART

For example, an I2C (Inter-Integrated Circuit) is often used in the past as a bus IF (interface) used for communication between devices through a bus in a board that has plural devices mounted therein. Moreover, realization of a higher-speed I2C has recently been demanded, and provision of an I3C (Improved Inter Integrated Circuit) has been formulated as the next-generation standard and its revision has been advanced.

For example, the I2C and the I3C are each configured to be able to execute communication with slaves connected to a bus IF in accordance with the control by a master that has the initiative of the communication through the bus IF. Moreover, the I3C provides such functions as a function to maintain the compatibility to enable execution of communication with I2C slaves and a function called "hot join" that enables a slave to participate in the bus IF in the course of communication.

For example, PTL 1 discloses a digital data processing system that mutually connects a host processor and a subsystem controller to each other using an I2C. Moreover, PTL 2 discloses a method of realizing a communication protocol that is arranged in layers in the upper portion of a standard I2C protocol.

CITATION LIST

Patent Literature

[PTL 1]
Japanese Patent Laid-open No. 2000-99448
[PTL 2]
Japanese Patent Laid-open No. 2002-175269

SUMMARY

Technical Problem

Relating to the above, when the hot join is executed in an I3C, a deadlock for a newly connected slave to be unable to participate in the bus IF may occur under a specific condition. It is therefore worried that the state is established where the newly connected slave cannot normally execute any communication.

This disclosure was conceived in view of the above circumstances and enables more reliable execution of communication.

Solution to Problem

A communicating apparatus in an aspect of this disclosure includes a transmitting and receiving part that executes transmission and reception of signals with at least one or more other communicating apparatuses, and an error avoiding part that, in a state where a communication system configured to be able to execute communication through a bus already operates, executes a process of avoiding occurrence of any error occurring when a communicating apparatus is additionally connected to the communication system.

A communication method or a program in an aspect of this disclosure includes a step of, in the state where a communication system configured to be able to execute transmission and reception of signals with at least one or more other communicating apparatuses and execute communication through a bus already operates, executing a process of avoiding occurrence of any error occurring when a communicating apparatus is additionally connected to the communication system.

A communication system in an aspect of this disclosure is a communication system configured to be able to execute communication through a bus using a first communicating apparatus that has the initiative of communication through the bus and a second communicating apparatus that executes communication in accordance with control by the first communicating apparatus, in which the first communicating apparatus and the second communicating apparatus each include a transmitting and receiving part that executes transmission and reception of signals with at least one or more other communicating apparatuses, and at least one of the first communicating apparatus or the second communicating apparatus includes an error avoiding part that, in the state where the first communicating apparatus is connected to at least the bus and the communication system already operates, executes a process of avoiding occurrence of any error occurring when a communicating apparatus is additionally connected to the communication system.

In an aspect of this disclosure, in the state where a communication system configured to be able to execute transmission and reception of signals with at least one or more other communicating apparatuses and execute communication through a bus already operates, a process is executed that avoids occurrence of any error occurring when a communicating apparatus is additionally connected to the communication system.

Advantageous Effect of Invention

According to an aspect of this disclosure, communication can further reliably be executed.

DESCRIPTION OF EMBODIMENTS

Specific embodiments to which this technique is applied will be described in detail with reference to the drawings.
<About Bus IF and Hot Join>

Figure 1:
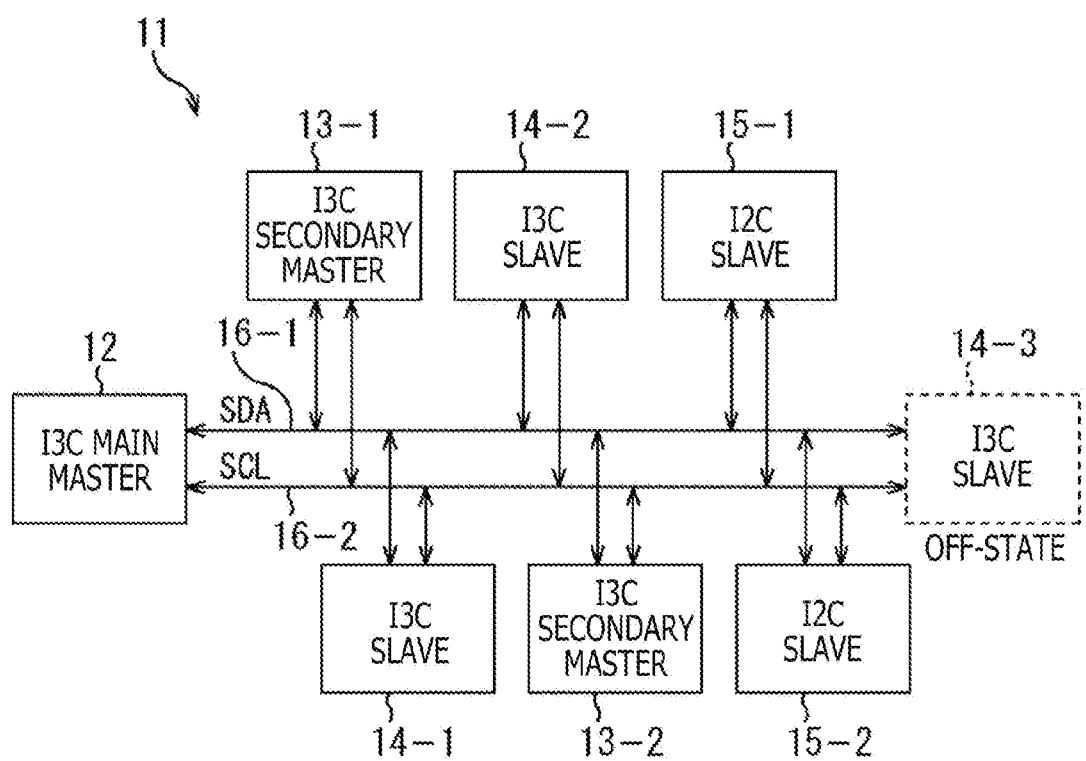
FIG. 1 is a diagram illustrating a bus IF and a hot join.

A bus IF configured complying with the I3C standard and a hot join of an I3C slave will be descried with reference to FIG. 1.

A bus IF 11 depicted in FIG. 1 is configured by connecting an I3C main master 12, I3C secondary masters 13-1 and 13-2, I3C slaves 14-1 to 14-3, and I2C slaves 15-1 and 15-2 to each other through a data signal line 16-1 and a clock signal line 16-2. FIG. 1 depicts an example where the I3C slave 14-3 is hot-joined to the bus IF 11.

The I3C main master 12 is a device having the initiative of the communication in the bus IF 11, and can execute communication with the other devices connected to the bus IF 11 through the data signal line 16-1 and the clock signal line 16-2.

The I3C secondary masters 13-1 and 13-2 are each a device that has a function of being able to have the initiative of the communication in the bus IF 11 instead of the I3C main master 12, and executes the operations similar to those of the I3C slave 14 when the communication is executed in accordance with the control by the I3C main master 12. In addition, hereinafter, when necessary, in a case where the I3C secondary masters 13-1 and 13-2 each do not need to be distinguished from each other, these secondary masters are each referred to simply as "I3C secondary master 13."

The I3C slaves 14-1 to 14-3 are each a device that executes communication in accordance with the control by the I3C main master 12, and can execute communication with the I3C main master 12 through the data signal line 16-1 and the clock signal line 16-2. In addition, hereinafter, when necessary, in a case where the I3C slaves 14-1 to 14-3 each do not need to be distinguished from each other, these I3C slaves are each referred to simply as "I3C slave 14."

The I2C slaves 15-1 and 15-2 are each a device that can execute communication in accordance with the I2C standard, and can execute communication in accordance with the control by the I3C main master 12 in the bus IF 11 because the I3C maintains the compatibility with the I2C. In addition, hereinafter, when necessary, in a case where the I2C slaves 15-1 and 15-2 each do not need to be distinguished from each other, these I2C slaves are each referred to simply as "I2C slave 15."

The data signal line 16-1 is a signal line that transmits serial data SDA, and the clock signal line 16-2 is a signal line that transmits a serial clock SCL.

As above, even though the bus IF 11 has the configuration to have not only the I3C secondary master 13 and the I3C slaves 14 complying with the I3C standard but also the I2C slave 15 complying with the I2C standard mixed therein, the bus IF 11 can normally operate.

Moreover, in the I3C, for example, for unused devices of the plural devices connected to the bus IF 11, reduction of the electric power consumption of the overall bus IF 11 can be facilitated by setting the electric power source to be in its off-state.

For example, as depicted in the upper side of FIG. 1, when the use of the I3C slave 14-3 whose power source is set to be in its off-state is started, the I3C slave 14-3 is hot-joined to the bus IF 11 in the state where the bus IF 11 is operated by the devices other than the I3C slave 14-3. In other words, as depicted in the lower side of FIG. 1, after the power source of the I3C slave 14-3 is switched to its on-state, a hot join request as described later is executed and the I3C slave 14-3 can thereby participate in the bus IF 11.

In addition, the I3C slave 14-3 also can be hot-joined by physically connecting the I3C slave 14-3 whose power source is in the on-state to the bus IF 11 in its operation state, in addition to turning on or off the power source of the I3C slave 14-3. Moreover, in addition to the case where the I3C slave 14 is additionally hot-joined to the bus IF 11 operated by the I3C main master 12, the I3C slaves 14, and the I2C slaves 15, the case may be present, for example, where one I3C slave 14 is newly hot-joined to the bus IF 11 operated by only one I3C main master 12.

The flow of a hot join request in the bus IF 11 in FIG. 1 will next be described with reference to FIG. 2.

For the bus IF 11, it can be provided that the I3C slave 14 supporting the hot join executes the hot join request by switching the potential of the data signal line 16-1 from an H-level to an L-level when the I3C slave 14 recognizes that the bus IF 11 is in an idling state. Moreover, the I3C slave 14 can recognize that the bus IF 11 is in the idling state, by detecting the fact using a bus idling counter that the state where the data signal line 16-1 and the clock signal line 16-2 are each at the H-level is maintained for a time period longer than a predetermined time period.

Figure 2:
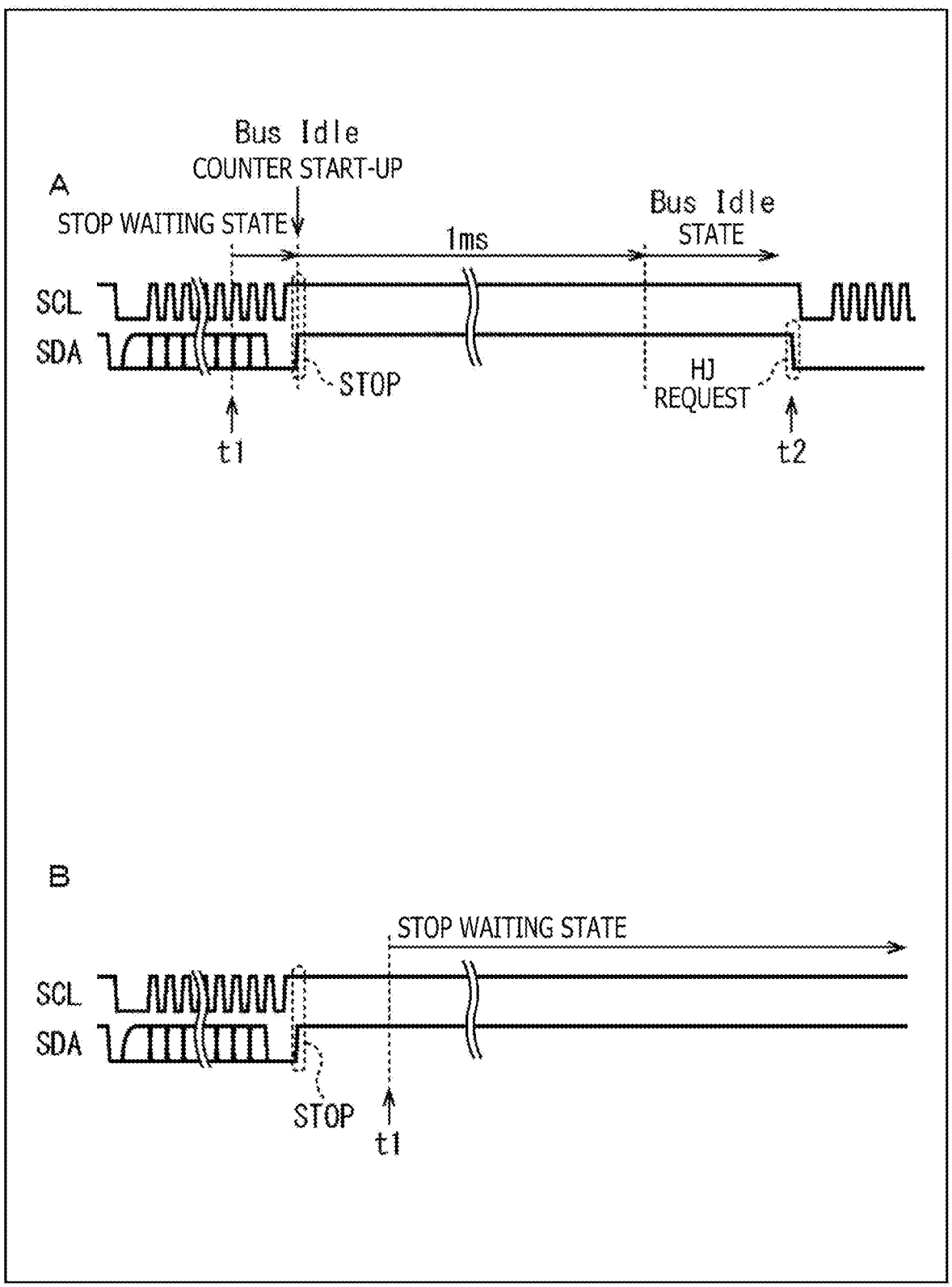
FIG. 2 is a diagram illustrating a flow of a hot join request.

Concerning the above, FIG. 2 each depict an example of the hot join request executed when detection of a stop condition (STOP) that declares the end of the communication by the bus IF 11 is set as a condition for the count starting point for the bus idling counter to start counting.

As depicted in A of FIG. 2, when the I3C slave 14 supporting the hot join is connected to the bus IF 11 at a timing t1 present during the execution of the communication of the bus IF 11, the I3C slave 14 is in the state where the I3C slave 14 waits for the stop condition to be detected. The I3C slave 14 connected to the bus IF 11 thereafter starts up the bus idling counter in response to the detection of the stop condition to start counting.

The I3C slave 14 can thereafter recognize that the bus IF 11 is in the idling state when the I3C slave 14 detects that the state where the potentials of the data signal line 16-1 and the clock signal line 16-2 are each at the H-level continues for a time period longer than the predetermined time period, for example, one ms. The I3C slave 14 supporting the hot join therefore executes the hot join request by switching the potential of the data signal line 16-1 from the H-level to the L-level at a timing t2 after I3C slave 14 recognizes that the bus IF 11 is in the idling state.

On the other hand, when the I3C main master 12 recognizes that the hot join request (or an interruption request) is present, the I3C main master 12 starts transmission of the serial clock SCL through the clock signal line 16-2 and can execute the communication process to be executed thereafter.

In this manner, when the I3C slave 14 is connected during the execution of the communication in the bus IF 11, the I3C slave 14 detects the stop condition, thereafter recognizes that the bus IF 11 is in the idling state, and can execute the hot join request without any problem.

As depicted in B of FIG. 2, however, in a case where the I3C slave 14 supporting the hot join is connected to the bus IF 11 at the timing t1 at which no communication of the bus IF 11 is executed, because the communication is completed between the I3C main master 12 and the other devices, no stop condition is issued. In this case, the I3C slave 14 connected to the bus IF 11 reaches a deadlock for the I3C slave 14 to continuously wait for the stop condition to be detected. Though connected to the bus IF 11, the I3C slave 14 cannot execute the hot join request and, as a result, is shifted into the state where the I3C slave 14 cannot participate in the bus IF 11.

In a case where the detection of the stop condition is set as the condition for the starting point of the counting by the bus idling counter as above, it is worried that the I3C slave 14 connected to the bus IF 11 reaches the deadlock. It is therefore necessary to enable avoidance of establishment of this state, reliable participation of the I3C slave 14 supporting the hot join in the bus IF 11, and normal execution of communication to be executed thereafter.

<First Example of Configuration of Bus IF>

Figure 3:
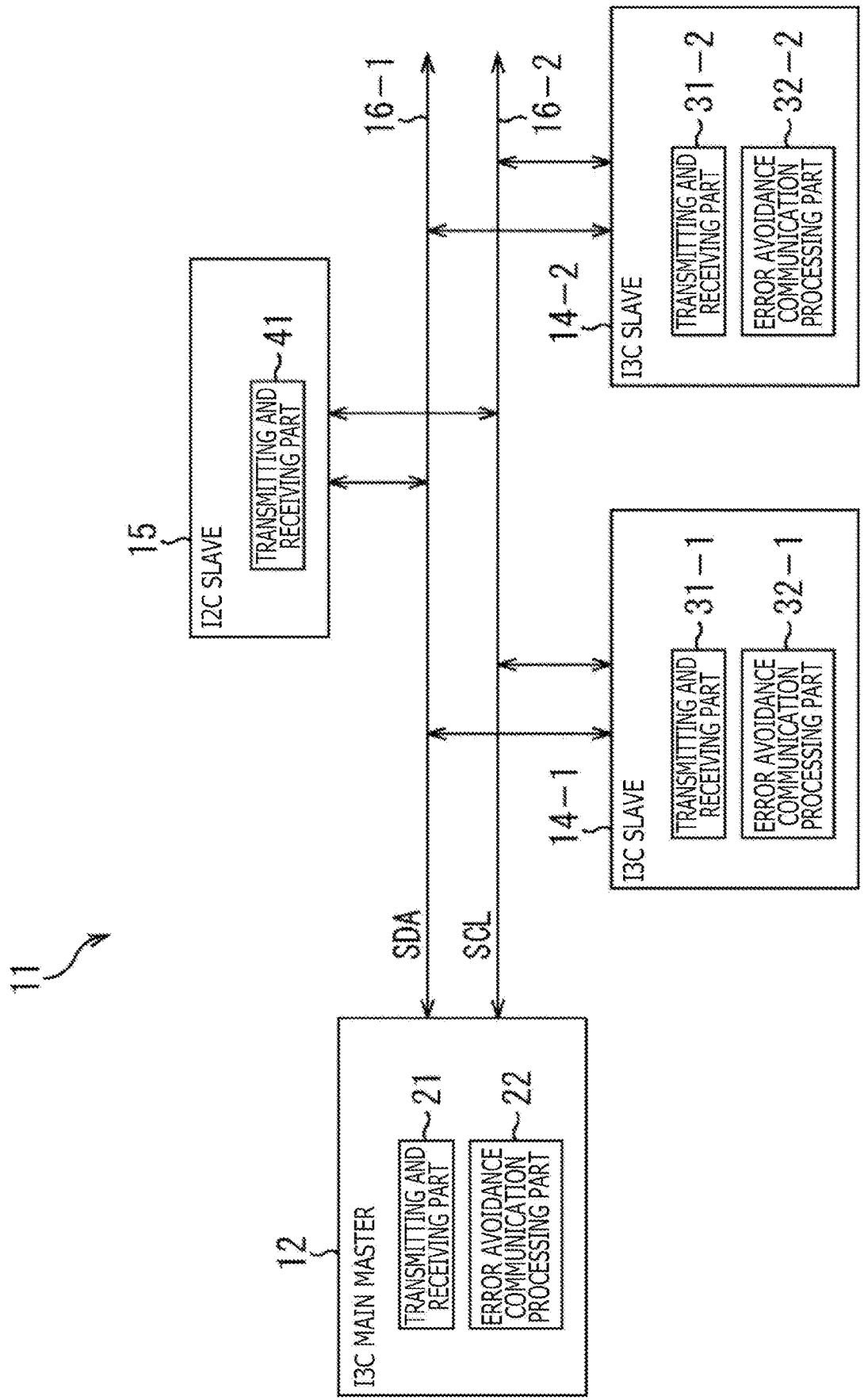
FIG. 3 is a block diagram depicting an example of a configuration of a first embodiment of the bus IF to which this technique is applied.

FIG. 3 is a block diagram depicting an example of a configuration of a first embodiment of the bus IF 11 to which this technique is applied.

The bus IF 11 depicted in FIG. 3 is configured by connecting the I3C main master 12, the I3C slaves 14-1 and 14-2, and the I2C slave 15 to each other through the data signal line 16-1 and the clock signal line 16-2.

The I3C main master 12 includes a transmitting and receiving part 21 and an error avoidance communication processing part 22.

The transmitting and receiving part 21 executes transmission and reception of signals with the I3C slaves 14 and the I2C slave 15 through the data signal line 16-1 and the clock signal line 16-2. For example, the transmitting and receiving part 21 transmits a signal to the I3C slave 14 or the I2C slave 15 by executing driving for the data signal line 16-1 (switching the potential to the H-level or the L-level) matching its timing with the timing of the serial clock SCL transmitted by driving the clock signal line 16-2. Moreover, the transmitting and receiving part 21 receives a signal transmitted from the I3C slave 14 or the I2C slave 15 by executing driving by the I3C slave 14 or the I2C slave 15 for the data signal line 16-1 matching its timing with the timing of the serial clock SCL of the clock signal line 16-2. In addition, the driving for the clock signal line 16-2 is always executed on the side of the master 12.

In the case where the I3C slave 14 supporting the hot join is likely to be connected to the bus IF 11, the error avoidance communication processing part 22 defines the lower limit of the communication speed for the transmitting and receiving part 21 in executing communication with the I2C slave 15. The error avoidance communication processing part 22 can thereby prevent occurrence of any communication error originated from the fact that an unintended hot join is executed during communication between the I3C main master 12 and the I2C slave 15, as described with reference to FIG. 4 described later. For example, as above, in a case where one ms is necessary for recognizing that the bus IF 11 is in the idling state when the I3C slave 14 is hot-joined, the error avoidance communication processing part 22 restricts the lower limit of the communication speed of the I2C slave 15 to, for example, one kHz (an H width=0.5 mS). In short, the time period during which the potential of the clock signal line 16-2 is at the H-level is restricted to be shorter than the time period necessary for recognizing the idling state of the bus IF 11 by the I3C slave 14, in accordance with the frequency of the serial clock SCL used by the I2C slave 15 in its communication.

The I3C slave 14 includes a transmitting and receiving part 31 and an error avoidance connection processing part 32.

The transmitting and receiving part 31 executes transmission and reception of signals with the I3C main master 12 through the data signal line 16-1 and the clock signal line 16-2. For example, the transmitting and receiving part 31 receives a signal transmitted from the I3C main master 12 by executing driving for the data signal line 16-1 by the main master 12 matching its timing with the timing of the serial clock SCL of the clock signal line 16-2. Moreover, the transmitting and receiving part 31 transmits a signal to the I3C main master 12 by executing driving for the data signal line 16-1 matching its timing with the timing of the serial clock SCL of the clock signal line 16-2.

The error avoidance connection processing part 32 executes a connection process to avoid occurrence of the deadlock as described with reference to FIG. 2 described above, and to enable the I3C slave 14 to reliably execute the hot join. For example, the error avoidance connection processing part 32 has the detection of the fact that the potentials of the data signal line 16-1 and the clock signal line 16-2 are each at the H-level, set therein as the condition for the starting point of the counting by the bus idling counter.

The error avoidance connection processing part 32 therefore monitors the potentials of the data signal line 16-1 and the clock signal line 16-2 and, starts up the bus idling counter at the timing at which the error avoidance connection processing part 32 detects that the potentials of the data signal line 16-1 and the clock signal line 16-2 are at the H-level. When the error avoidance connection processing part 32 thereafter detects that the state where the potentials of the data signal line 16-1 and the clock signal line 16-2 are each at the H-level continues for a time period longer than one ms, the error avoidance connection processing part 32 recognizes that the bus IF 11 is in the idling state and executes the hot join request.

The I2C slave 15 includes a transmitting and receiving part 41, and the transmitting and receiving part 41 executes transmission and reception of signals with the I3C main master 12 through the data signal line 16-1 and the clock signal line 16-2. For example, for the I2C, it is provided that the communication is executed using a serial clock SCL whose speed is lower than that of the communication in the I3C, and the I2C slave 15 executes communication at a speed lower than that of the I3C slave 14.

The hot join request in the bus IF 11 in FIG. 3 will be described with reference to FIG. 4.

As described above with reference to FIG. 3, the error avoidance connection processing part 32 of the I3C slave 14 has the detection of the fact that the potentials of the data signal line 16-1 and the clock signal line 16-2 are each at the H-level, set therein as the condition for the starting point of the counting by the bus idling counter. Moreover, it is provided for the I3C that, when the fact is detected that the state where the potentials of the data signal line 16-1 and the clock signal line 16-2 are each at the H-level continues for a time period longer than one ms, it is recognized that the bus IF 11 is in the idling state and the hot join request is executed.

For example, when the I3C main master 12 executes communication with the I3C slave 14, the state where the potentials of the data signal line 16-1 and the clock signal line 16-2 are each at the H-level continues for less than one ms. The hot join request is therefore not executed because the bus IF 11 is not in the idling state even when the I3C slave 14 supporting the hot join is connected to the bus IF 11 during the communication by the I3C main master 12 with another I3C slave 14. In this case, therefore, at the timing at which the I3C main master 12 finishes its communication with the other I3C slave 14, the I3C slave 14 connected to the bus IF 11 can detect that the potentials of the data signal line 16-1 and the clock signal line 16-2 each become the H-level and can start up the bus idling counter.

Figure 4:
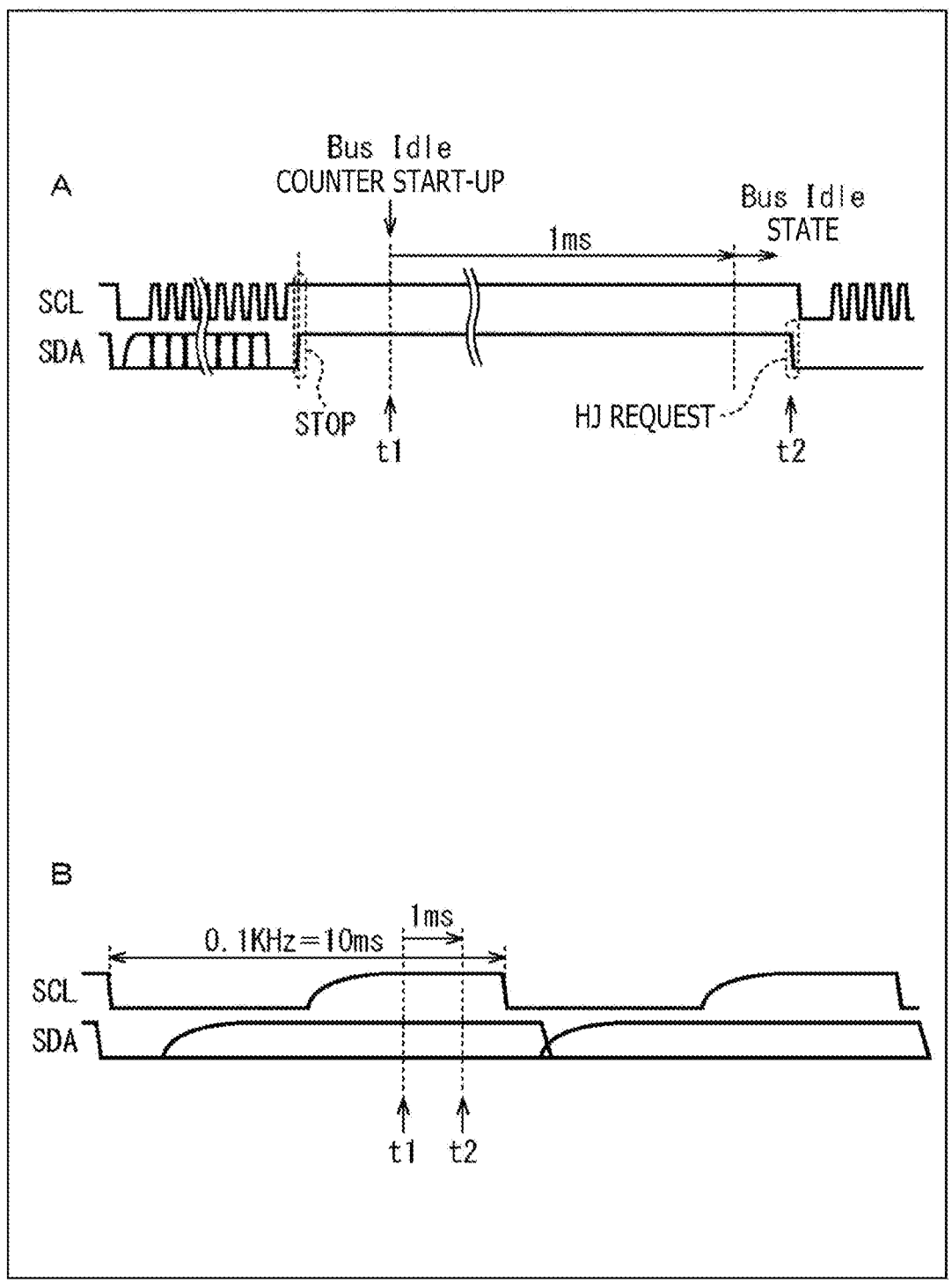
FIG. 4 is a diagram illustrating the hot join request.

It is assumed that the I3C slave 14 supporting the hot join is thereafter connected to the bus IF 11 at the timing t1 at which no communication of the bus IF 11 is executed as depicted in A of FIG. 4. In this case, the error avoidance connection processing part 32 of the I3C slave 14 detects the fact that the potentials of the data signal line 16-1 and the clock signal line 16-2 are each at the H-level, and starts up the bus idling counter. When the error avoidance connection processing part 32 thereafter detects the fact that the state where the potentials of the data signal line 16-1 and the clock signal line 16-2 are each at the H-level continues for a time period that is longer than one ms, the error avoidance connection processing part 32 can recognize that the bus IF 11 is in the idling state. The error avoidance connection processing part 32 can therefore execute the hot join request by switching the potential of the data signal line 16-1 from the H-level to the L-level at the timing t2 at which the error avoidance connection processing part 32 recognizes that the bus IF 11 is in the idling state.

Occurrence of any deadlock as described above with reference to FIG. 2 can be avoided by setting the detection of the fact that the potentials of the data signal line 16-1 and the clock signal line 16-2 are each at the H-level, as the condition for the starting point of the counting by the bus idling counter as above.

In other words, the I3C slave 14 supporting the hot join can reliably execute the hot join avoiding reaching the deadlock regardless of whether or not any communication is executed in the bus IF 11 at the timing at which the I3C slave 14 is connected to the bus IF 11. The bus IF 11 can therefore reliably have the I3C slave 14 participated in the bus IF 11, and can normally execute the communication to be executed thereafter.

Relating to the above, in the I2C, the communication is executed using the serial clock SCL at a speed lower than that of the communication in the I3C and the communication may therefore be executed at a speed that is very low, for example, 0.1 kHz (=10 ms) or the like. Therefore, when the I3C main master 12 executes communication with the I2C slave 15, the state where the potentials of the data signal line 16-1 and the clock signal line 16-2 are at the H-level may continue for a time period longer than one ms.

For example, as depicted in B of FIG. 4, the state where the potentials of the data signal line 16-1 and the clock signal line 16-2 are each at the H-level may continue for a time period longer than one ms depending on the timing t1 at which the I3C slave 14 supporting the hot join is connected to the bus IF 11. The I3C slave 14 connected to the bus IF 11 may mistakenly execute the hot join request at the timing t2 at which the I3C slave 14 wrongly recognizes that the bus IF 11 is in the idling state. It is however assumed that a communication error occurs being originated from the unintended hot join request because the I3C main master 12 and the I2C slave 15 are in communication with each other at the timing t2.

The error avoidance communication processing part 22 of the I3C main master 12 therefore restricts the lower limit of the communication speed employed when the I3C main master 12 executes communication with the I2C slave 15 to, for example, one kHz (H-width=0.5 mS) in the case where the I3C slave 14 supporting the hot join is likely to be connected to the bus IF 11. The fact that the state where the data signal line 16-1 and the clock signal line 16-2 are each at the H-level continues for a time period longer than one ms can thereby be avoided when the I3C main master 12 executes communication with the I2C slave 15.

Any unintended hot join request is therefore not executed during the communication between the I3C main master 12 and the I2C slave 15, and any occurrence of the above communication error is avoided.

In addition, when the I3C slave 14 supporting the hot join is unlikely to be connected to the bus IF 11, the lower limit of the communication speed employed when the communication is executed with the I2C slave 15 does not need to be restricted. The firmware of the I3C main master 12 has information written therein in advance that indicates whether or not the I3C slave 14 supporting the hot join is likely to be connected to the bus IF 11, as setting information (a requirement) that a system designing engineer of the bus IF 11 needs to know when this engineer executes the designing. In addition, the firmware of the I3C main master 12 has such pieces of information written therein as the quantity of the devices complying with the standard of the I3C that are connected to the bus IF 11, the static addresses of these devices, and information relating to the I2C slave 15 connected to the bus IF 11, as the setting information.

As above, the reason why the information indicating whether or not the I3C slave 14 supporting the hot join is likely to be connected to the bus IF 11 is written into the firmware of the I3C main master 12 is that the I3C main master 12 cannot recognize the information in advance. For example, it is assumed that a flag indicating that an I3C slave 14 supports the hot join is set in a register inside the I3C slave 14 connected to the bus IF 11. The I3C main master 12 however cannot read the content the register through the bus IF 11 before the power source of this I3C slave 14 is turned to its on-state. In other words, before the hot join is executed, the I3C main master 12 cannot recognize whether or not the I3C slave 14 supporting the hot join is connected to the bus IF 11.

As above, it is therefore necessary for the information indicating whether or not the I3C slave 14 supporting the hot join is likely to be connected to the bus IF 11, to be written in advance into the firmware of the I3C main master 12. Concerning this, in addition to the writing into the firmware, whether or not the I3C slave 14 supporting the hot join is likely to be connected to the bus IF 11 can be recognized by setting, for example, a pin using an external connection terminal disposed in the I3C main master 12.

<Processes Executed by I3C Main Master and I3C Slave>

Figure 5:
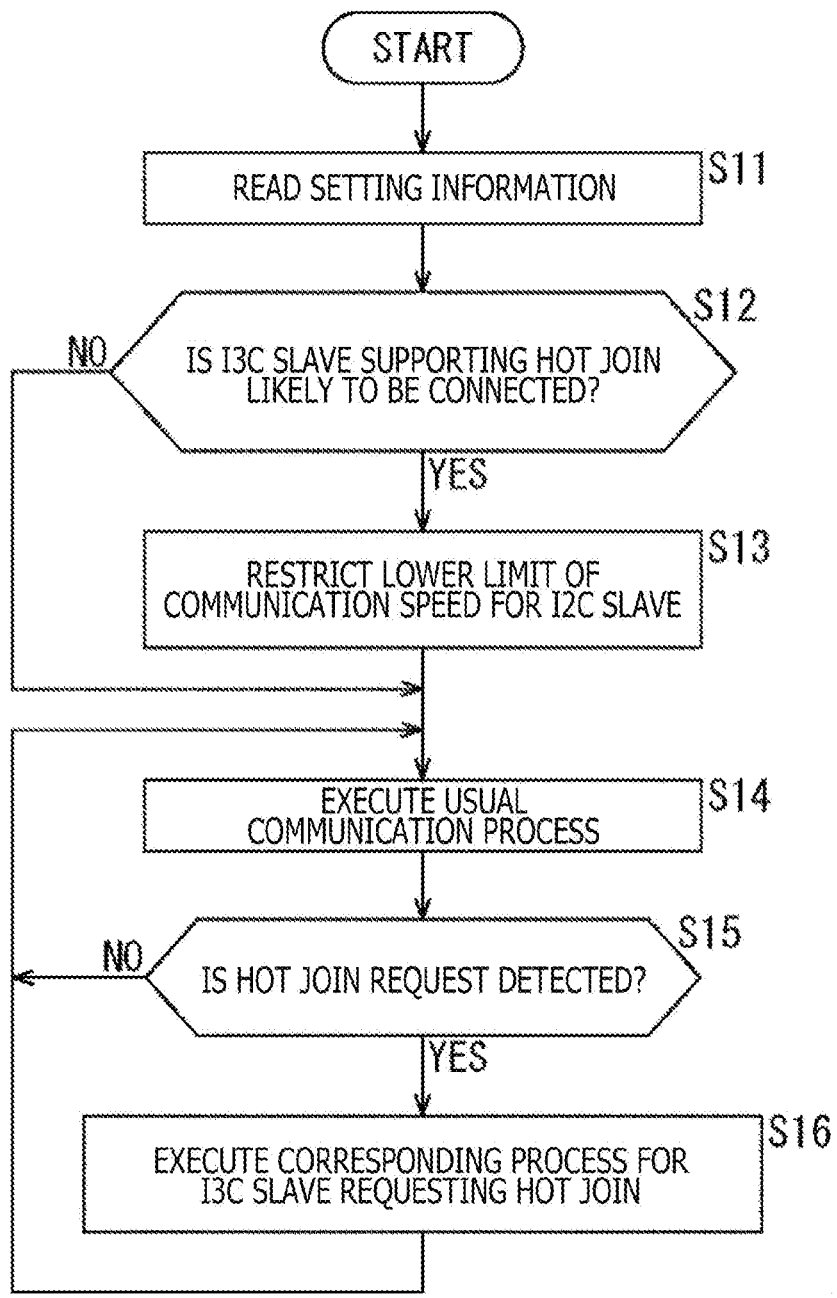
FIG. 5 is a flowchart illustrating processes executed by an I3C main master.

Processes executed by the I3C main master 12 will be described with reference to a flowchart depicted in FIG. 5.

For example, when the power source of the I3C main master 12 is turned on, the processes are started and, at step S11, the error avoidance communication processing part 22 reads the setting information written in the firmware of the I3C main master 12.

At step S12, the error avoidance communication processing part 22 determines whether or not the I3C slave 14 supporting the hot join is likely to be connected to the bus IF 11, on the basis of the setting information read at step S11.

In a case where the error avoidance communication processing part 22 determines at step S12 that the I3C slave 14 supporting the hot join is likely to be connected to the bus IF 11, the process advances to step S13. On the other hand, in the case where the error avoidance communication processing part 22 determines at step S12 that the I3C slave 14 is unlikely to be connected to the bus IF 11, the process at step S13 is not executed.

At step S13, the error avoidance communication processing part 22 defines the lower limit of the communication speed employed when communication is executed with the I2C slave 15, for the transmitting and receiving part 21. In accordance with this, the transmitting and receiving part 21 restricts the lower limit of the communication speed for the I2C slave 15 to, for example, approximately one kHz (H-width=0.5 mS).

At step S14, thereafter, the I3C main master 12 executes the usual communication process and the transmitting and receiving part 21 executes transmission and reception of signals with the I3C slave 14 or the I2C slave 15.

At step S15, the transmitting and receiving part 21 determines whether or not the hot join request by the I3C slave 14 supporting the hot join is detected. In the case, for example, where the potential of the data signal line 16-1 is switched from the H-level to the L-level when the bus IF 11 is in the idling state, the transmitting and receiving part 21 determines that the hot join request is detected.

In a case where the transmitting and receiving part 21 determines at step S15 that the hot join request by the I3C slave 14 supporting the hot join is not detected, the process returns to step S14 and the usual communication process is thereafter similarly executed continuously.

On the other hand, in the case where the transmitting and receiving part 21 determines at step S15 that the hot join request by the I3C slave 14 supporting the hot join is detected, the process advances to step S16.

At step S16, the transmitting and receiving part 21 executes various types of process necessary for the participation in the bus IF 11, with the I3C slave 14 that requests the hot join. The process thereafter returns to step S14 and the usual communication process is thereafter similarly executed continuously.

As above, in the case where the I3C slave 14 supporting the hot join is likely to be connected to the bus IF 11, the I3C main master 12 can restrict the lower limit of the communication speed for the I2C slave 15. The I3C main master 12 can thereby avoid execution of any unintended hot join request during the communication by the I2C slave 15 and can prevent occurrence of any communication error originated from the hot join request. The I3C main master 12 can therefore more reliably execute the communication in the bus IF 11.

Figure 6:
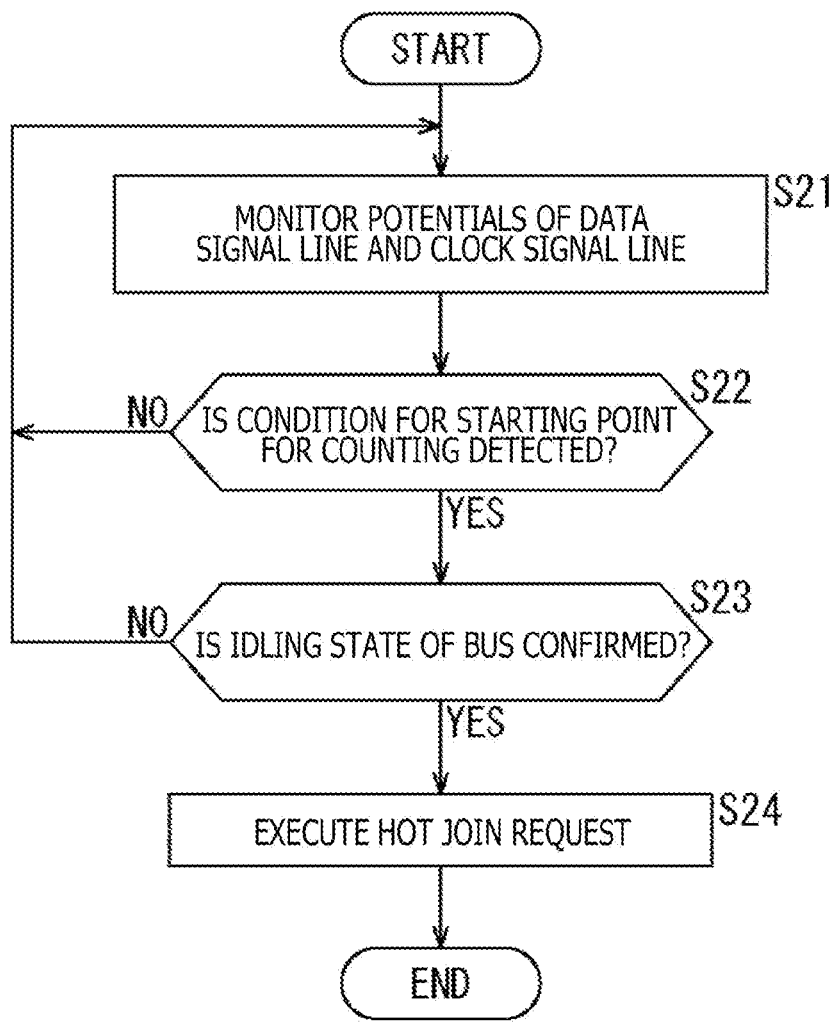
FIG. 6 is a flowchart illustrating processes executed by an I3C slave when the I3C slave executes the hot join.

Processes executed by the I3C slave 14 when the I3C slave 14 executes the hot join will be described with reference to a flowchart depicted in FIG. 6.

For example, when the power source of the I3C slave 14 connected to the bus IF 11 is turned on, the processes are started and, at step S21, the error avoidance connection processing part 32 monitors the potentials of the data signal line 16-1 and the clock signal line 16-2.

At step S22, the error avoidance connection processing part 32 determines whether or not the condition for the starting point of the counting by the bus idling counter is detected, on the basis of the result of the monitoring for the potentials at step S21. For example, as described above with reference to FIG. 3 described above, the error avoidance connection processing part 32 determines that the condition for the starting point of the counting by the bus idling counter is detected when the error avoidance connection processing part 32 detects that the potentials of the data signal line 16-1 and the clock signal line 16-2 are each at the H-level.

At step S22, in a case where the error avoidance connection processing part 32 determines at step S22 that the condition for the starting point of the counting by the bus idling counter is not detected, the process returns to step S21 and the monitoring for the potentials of the data signal line 16-1 and the clock signal line 16-2 is continuously executed.

On the other hand, in the case where the error avoidance connection processing part 32 determines at step S22 that the condition for the starting point of the counting by the bus idling counter is detected, the error avoidance connection processing part 32 starts up the bus idling counter to start the counting and the process advances to step S23.

At step S23, the error avoidance connection processing part 32 determines whether or not it is confirmed that the bus IF 11 is in the idling state. For example, the bus idling counter continues the counting only during the time period in which the data signal line 16-1 and the clock signal line 16-2 are each maintained to be at the H-level. The error avoidance connection processing part 32 therefore can confirm that the bus IF 11 is in the idling state when the count by the bus idling counter exceeds one ms.

In the case where the error avoidance connection processing part 32 determines at step S23 that it is not confirmed that the bus IF 11 is in the idling state, the process returns to step S21. For example, in a case where the potential of the data signal line 16-1 or the clock signal line 16-2 becomes the L-level within the time period in which the count by the bus idling counter is less than one ms, the error avoidance connection processing part 32 determines that it is not confirmed that the bus IF 11 is in the idling state. In short, in this case, the bus IF 11 is not in the idling state and the hot join request is therefore not executed, and the process returns to step S21 and the monitoring for the potentials of the data signal line 16-1 and the clock signal line 16-2 is continuously executed.

On the other hand, in the case where the error avoidance connection processing part 32 determines at step S23 that it is confirmed that the bus IF 11 is in the idling state, the process advances to step S24 and the error avoidance connection processing part 32 instructs the transmitting and receiving part 31 to execute the hot join request. In response to this, the transmitting and receiving part 31 executes the hot join request by switching the potential of the data signal line 16-1 from the H-level to the L-level.

After the process at step S24, the process executed when the I3C slave 14 executes the hot join comes to an end. Thereafter, for example, at step S16 in FIG. 5 described above, various types of process necessary for the participation in the bus IF 11 are executed with the I3C main master 12, and the I3C slave 14 can participate in the bus IF 11.

As above, the I3C slave 14 can confirm whether or not the bus IF 11 is in the idling state, using the detection of the fact that the potentials of the data signal line 16-1 and the clock signal line 16-2 are each at the H-level as the condition for the starting point of the counting by the bus idling counter. The fact can thereby be avoided that the I3C slave 14 connected to the bus IF 11 cannot start the confirmation as to whether or not the bus IF 11 is in the idling state and therefore cannot participate in the bus IF 11. The I3C slave 14 connected to the bus IF 11 can therefore reliably execute the hot join request and can participate in the bus IF 11 to execute the communication.

<Second Example of Configuration of Bus IF>

Figure 7:
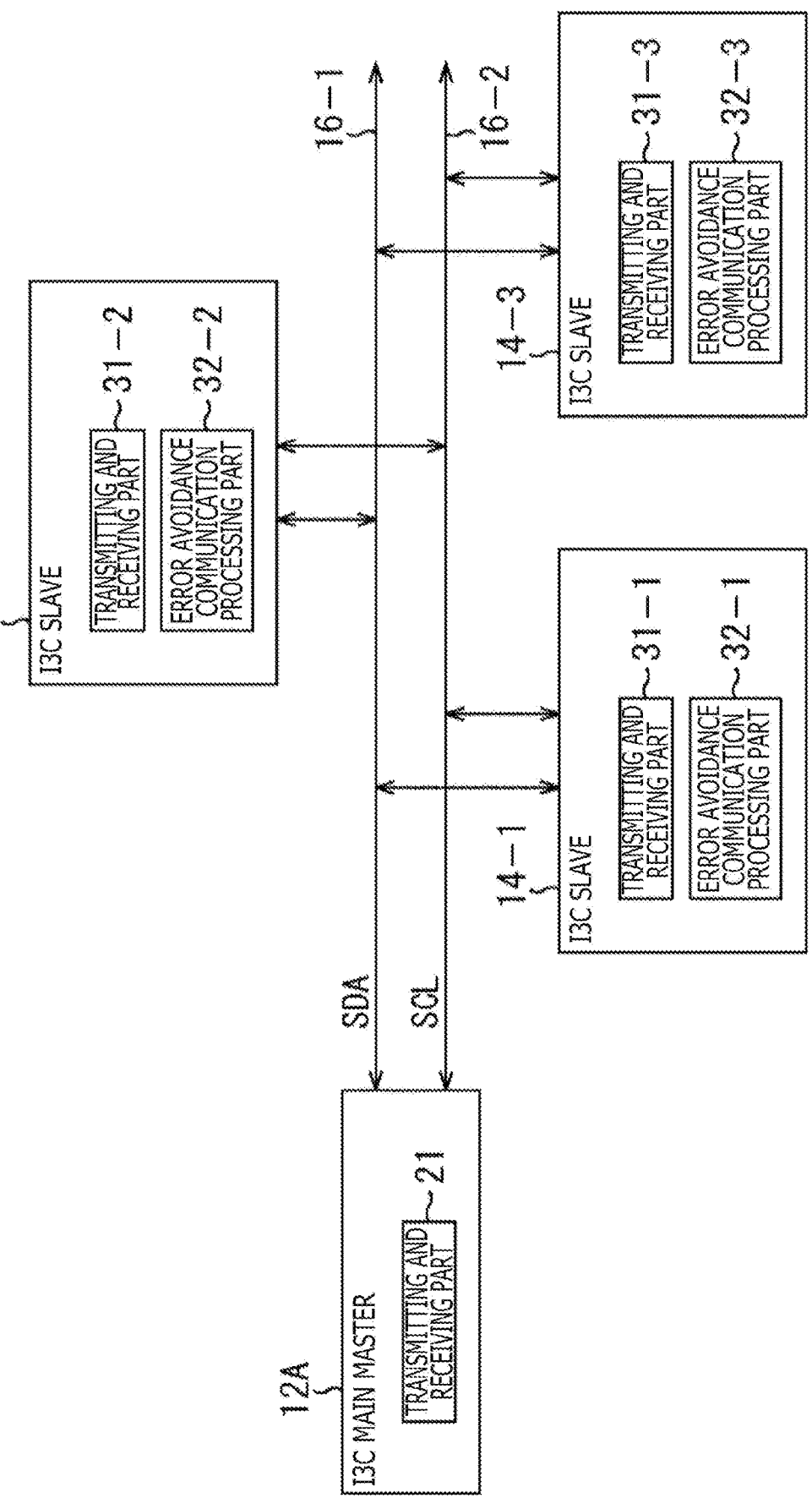
FIG. 7 is a block diagram depicting an example of a configuration of a second embodiment of the bus IF to which this technique is applied.

FIG. 7 is a block diagram depicting an example of a configuration of a second embodiment of the bus IF 11 to which this technique is applied.

A bus IF 11A depicted in FIG. 7 is configured by connecting an I3C main master 12A and I3C slaves 14-1 to 14-3 to each other through the data signal line 16-1 and the clock signal line 16-2. In addition, in the bus IF 11A, configurations common to those of the bus IF 11 in FIG. 3 are given the same reference numerals and will not again be described in detail.

In other words, the bus IF 11A has the configuration that is different from that of the bus IF 11 descried with reference to FIG. 3 in the point that the bus IF 11A is prohibited from coexisting with the I2C slave 15 and is configured not to be connected to the I2C slave 15.

As above, an unintended hot join request may be executed during the communication between the I3C main master 12 and the I2C slave 15 because the coexistence with the I2C slave 15 is permitted for the bus IF 11 in FIG. 3, and a communication error may thereby occur. The bus IF 11 in FIG. 3 therefore needs to avoid occurrence of any communication error by restricting the lower limit of the communication speed employed when the I3C main master 12 executes communication with the I2C slave 15.

In contrast, the bus IF 11A is configured not to be connected to the I2C slave 15 and any unintended hot join request is therefore also not executed. The I3C main master 12A therefore only has to include the transmitting and receiving part 21 and is configured not to need to include the error avoidance communication processing part 22 in FIG. 3.

Moreover, similar to the I3C slave 14 of the bus IF 11 in FIG. 3, the I3C slave 14 of the bus IF 11A includes the transmitting and receiving part 31 and the error avoidance connection processing part 32, and can execute the hot join without reaching any deadlock. In other words, when the error avoidance connection processing part 32 of the I3C slave 14 detects the fact that the potentials of the data signal line 16-1 and the clock signal line 16-2 are each at the H-level, the error avoidance connection processing part 32 causes the counting by the bus idling counter to start and confirms whether or not the bus IF 11 is in the idling state. In short, the I3C slave 14 can execute the processes similar to those in the flowchart depicted in FIG. 5.

As above, no communication error originated from any unintended hot join request occurs and the I3C slave 14 connected to the bus IF 11A can reliably execute the hot join, by configuring the bus IF 11A to be prohibited from coexisting with the I2C slave 15. In the bus IF 11A, the hot-joined I3C slave 14 can therefore reliably execute communication.

Relating to the above, a measure needs to be taken against the fact that the I2C slave 15 is connected to the bus IF 11A even though any coexistence with the I2C slave 15 is prohibited.

For example, when the I3C main master 12A executes communication with the I2C slave 15 connected against the prohibited item, the I3C slave 14 executes the hot join request and a communication error (hereinafter, when necessary, referred to as "HJ request error") thereby occurs. Associated with occurrence of the propagation delay, however, the I3C main master 12A may be unable to detect the HJ request error.

Signals that flow when the HJ request error occurs during the communication executed by the I3C main master 12A with the I2C slave 15 at a communication speed of 0.1 kHz (=10 ms) will be described with reference to FIG. 8.

Figure 8:
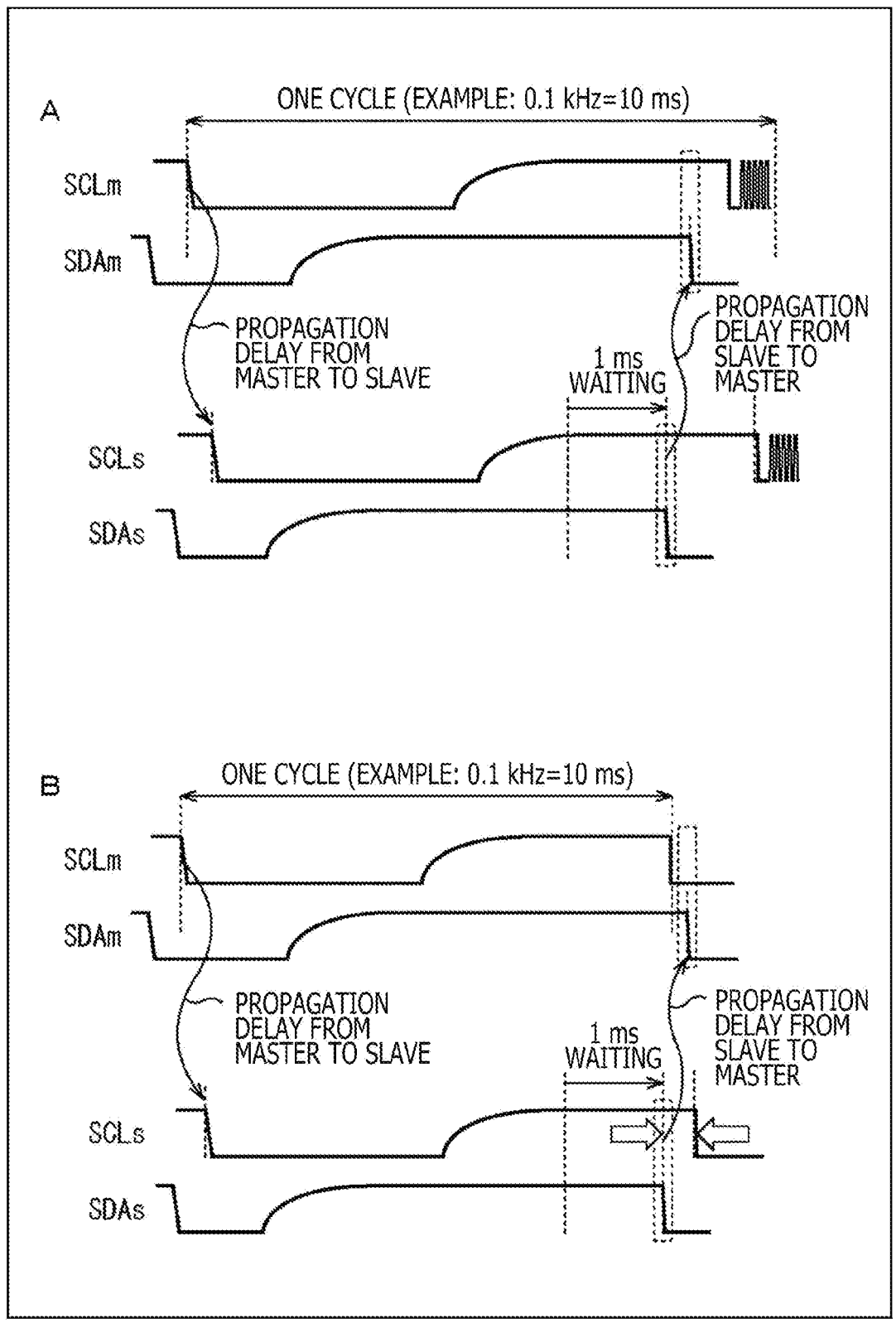
FIG. 8 is a diagram illustrating detection of an HJ request error.

A of FIG. 8 depicts waveforms of signals flowing in a case where the I3C main master 12A can detect the HJ request error, and B of FIG. 8 depicts waveforms of signals flowing in a case where the I3C main master 12A cannot detect the HJ request error. Moreover, on the upper side of each of A of FIG. 8 and B of FIG. 8, a serial clock SCLm at an output terminal of the I3C main master 12A and serial data SDAm at the output terminal of the I3C main master 12A are depicted. Similarly, on the lower side of each of A of FIG. 8 and B of FIG. 8, a serial clock SCLs at the output terminal of the I3C slave 14 and serial data SDAs at the output terminal of the I3C slave 14 are depicted.

As depicted in A of FIG. 8, when the I3C main master 12A drives the serial clock SCLm from the H-level to the L-level, the serial clock SCLs is delayed in accordance with the propagation delay and is thereafter switched from the H-level to the L-level. Thereafter, in a case where the serial clock SCLs and the serial data SDAs are each at the H-level, when the I3C slave 14 supporting the hot join is connected to the bus IF 11A, the I3C slave 14 starts up the bus idling counter. When one ms thereafter elapses with the serial clock SCLs and the serial data SDAs maintained each to be at the H-level, the I3C slave 14 drives the serial clock SCLs from the H-level to the L-level and executes the hot join request.

At this time, as depicted in A of FIG. 8, in a case where the timing up to the time when the serial clock SCLm is switched from the H-level to the L-level in accordance with the propagation delay is ahead of the timing at which the I3C main master 12A drives the serial clock SCLm from the H-level to the L-level, the I3C main master 12A can detect the HJ request error. In this case, the I3C main master 12A therefore stops the transmission of the serial clock SCL at the communication speed used in the communication with the I2C slave 15 before driving the serial clock SCLm from the H-level to the L-level in accordance with the communication speed used in the communication with the I2C slave 15. The I3C main master 12A thereafter switches to the transmission of the serial clock SCL at the communication speed used in the communication with I3C slave 14 and can execute communication with the I3C slave 14.

On the other hand, as depicted in B of FIG. 8, in the case where the timing up to the time when the serial clock SCLm is switched from the H-level to the L-level in accordance with the propagation delay is behind the timing at which the I3C main master 12A drives the serial clock SCLm from the H-level to the L-level, the I3C main master 12A cannot detect the HJ request error. In short, in a case where a gap from the execution of the hot join request to the switching of the serial clock SCLs from the H-level to the L-level in accordance with the driving by the I3C main master 12A is small as indicated by inside-white arrows in B of FIG. 8, detection of the HJ request error is difficult. In this case, the I3C main master 12A therefore cannot execute any communication with the I3C slave 14.

Against the state where the HJ request error occurs as above, the I3C main master 12A or the I2C slave 15 can take a first to a fourth measures described below.

In the first measure, in the case where the I3C main master 12A can detect the HJ request error, the I3C main master 12A discontinues the communication with the I2C slave 15 prioritizing the I3C slave 14 that requests the hot join. The I3C main master 12A thereafter transmits the serial clock SCL at the communication speed used in the communication for the I3C, and executes the processes necessary for the I3C slave 14 to participate in the bus IF 11A. The I3C main master 12A thereafter restarts the communication with the I2C slave 15 at the communication speed equal to that used before the discontinuation. In addition, in the first measure, the I3C main master 12A may again detect the HJ request error. The I3C main master 12A therefore needs to execute the same process every time the I3C main master 12A detects the HJ request error.

In the second measure, in the case where the I3C main master 12A can detect the HJ request error, the I3C main master 12A discontinues the communication with the I2C slave 15 prioritizing the I3C slave 14 that requests the hot join. The I3C main master 12A thereafter transmits the serial clock SCL at the communication speed used in the communication for the I3C, and executes the processes necessary for the I3C slave 14 to participate in the bus IF 11A. The I3C main master 12A thereafter increases the communication speed to be higher than that before the discontinuation of the communication to the extent that no HJ request error occurs, setting the serial clock SCL to be, for example, equal to or higher than 0.1 kHz, and restarts the communication with the I2C slave 15.

In the third measure, in the case where the I3C main master 12A can detect the HJ request error, the I3C main master 12A discontinues the communication with the I2C slave 15 prioritizing the I3C slave 14 that requests the hot join. The I3C main master 12A thereafter collectively transmits a common command code (DISEC CCC) that instructs the I3C slaves 14 each supporting the hot join to thereafter request no hot join, to these I3C slaves 14. The hot join request is thereby set to be invalid (a Hot-Join Event bit is disabled) in each of the I3C slaves 14 connected to the bus IF 11A. The I3C main master 12A thereafter restarts the discontinued communication with the I2C slave 15.

In the fourth measure, in the case where the I3C main master 12A cannot detect the HJ request error, the I3C main master 12A continuously executes the communication with the I2C slave 15. It is therefore necessary to enable the I3C slave 14 to recognize that the I3C main master 12A cannot detect the HJ request error and to execute again the hot join request.

Concerning the above, the fourth measure will be described with reference to signals transmitted following the hot join request depicted in FIG. 9.

For example, following the transmission of the hot join request (S), the I3C slave 14 transmits a hot join reservation address (0x02). In addition, the hot join request, that is, the driving to switch the serial data SDA from the H-level to the L-level is driven similarly to the issuance of a start condition (START).

On the other hand, in the I3C, it is provided that the I3C main master 12A having the hot join request (S) received therein and having next the hot join reservation address (0x02) received therein selects and executes one of the following three operations.

As the first operation, the I3C main master 12A transmits a NACK (Negative Acknowledgement) that indicates that the reception of a signal cannot normally be executed. The I3C slave 14 having the NACK received therein can retry the hot join request.

As the second operation, the I3C main master 12A once transmits an ACK (Acknowledgement) that indicates that the reception of the signal can normally be executed and, next transmits the common command code (DISEC CCC) that instructs not to request any hot join. Similarly to the above third measure, the hot join request is set to be invalid (the Hot-Join Event bit is disabled) in the I3C slave 14.

Figure 9:
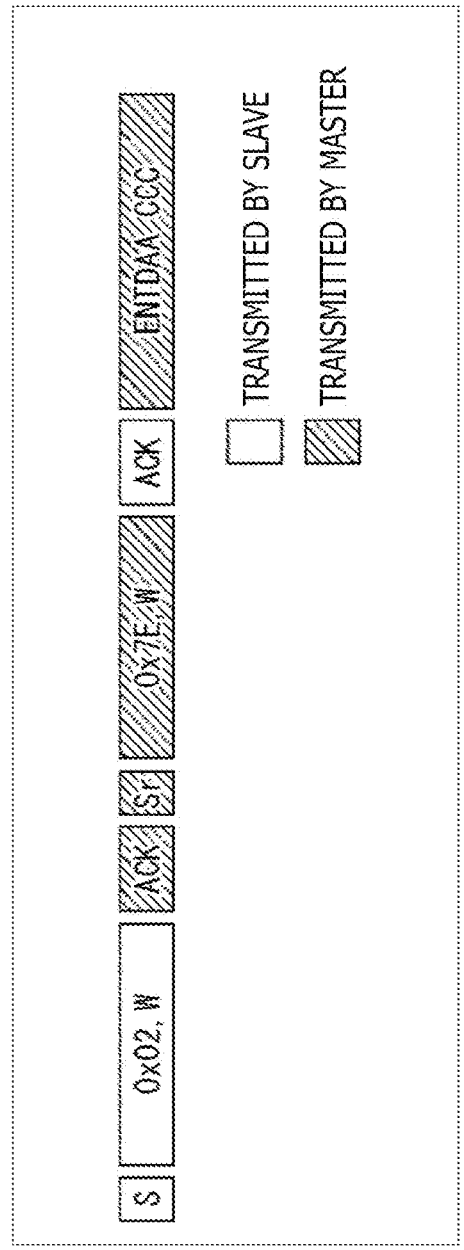
FIG. 9 is a diagram depicting an example of signals transmitted following the hot joint request.

As the third operation, as depicted in FIG. 9, after transmitting the ACK, the I3C main master 12A transmits an ENTDAA (Enter Dynamic Device Assignment) that inputs a dynamic device assignment and thereby assigns an address.

As above, in the I3C, it is defined that the I3C main master 12A executes the first to the third operations in response to the hot join request. The I3C slave 14 can therefore recognize an error caused by the fact that any operation different from the operations defined for the hot join request is executed (hereinafter, referred to as "HJ format error") in a case where the I3C slave 14 detects that any operation other than these is executed.

Concerning the above, in the case where the I3C main master 12A cannot detect the HJ request error, the I3C main master 12A continuously executes the communication with the I2C slave 15. On the other hand, the I3C slave 14 requesting the hot join tries to continue the communication to be executed thereafter by executing transmission of the hot join reservation address (0x02) and the like. In a case where the I3C main master 12A continuously executes the communication with the I2C slave 15 as above, the I3C slave 14 requesting the hot join can detect the HJ format error on the basis of the fact that none of the first to the third operations described above is executed.

In the fourth measure, after detecting the HJ format error, the I3C slave 14 therefore once stops the process of executing the hot join request and again executes the hot join request after a sufficient time period elapses. The I3C slave 14 can thereby be avoided from reaching the deadlock.

In addition, as another method in the fourth measure, a method for the I3C slave 14 to use a monitoring error (an existing S6 error) may be employed. The "monitoring error" is an error that in principle indicates the fact that the value transmitted by the I3C slave 14 itself and the data transmitted in the bus IF 11A do not match with each other.

For example, in a case where the I3C slave 14 transmits the hot join request while the I3C main master 12A transmits a signal to the I2C slave 15, the signals collide with each other in the bus IF 11A and a monitoring error is thereby detected from each of both of the signals. After detecting the monitor error, the I3C slave 14 therefore once stops the process of executing the hot join request and again executes the hot join request after a sufficient time period elapses. The I3C slave 14 can thereby be avoided from reaching the deadlock.

As above, it is provided for the bus IF 11A whose coexistence with the I2C slave 15 is prohibited, to execute the above first to the above fourth measures. The I2C slave 15 is connected to the bus IF 11A against the prohibited item and, even when the HJ request error occurs, the I3C main master 12A can respond to the hot join request by the I3C slave 14 that is connected to the bus IF 11A. The I3C slave 14 requesting the hot join can reliably participate in the bus IF 11A and can normally execute the communication to be executed thereafter.

<Third Example of Configuration of Bus IF>

Figure 10:
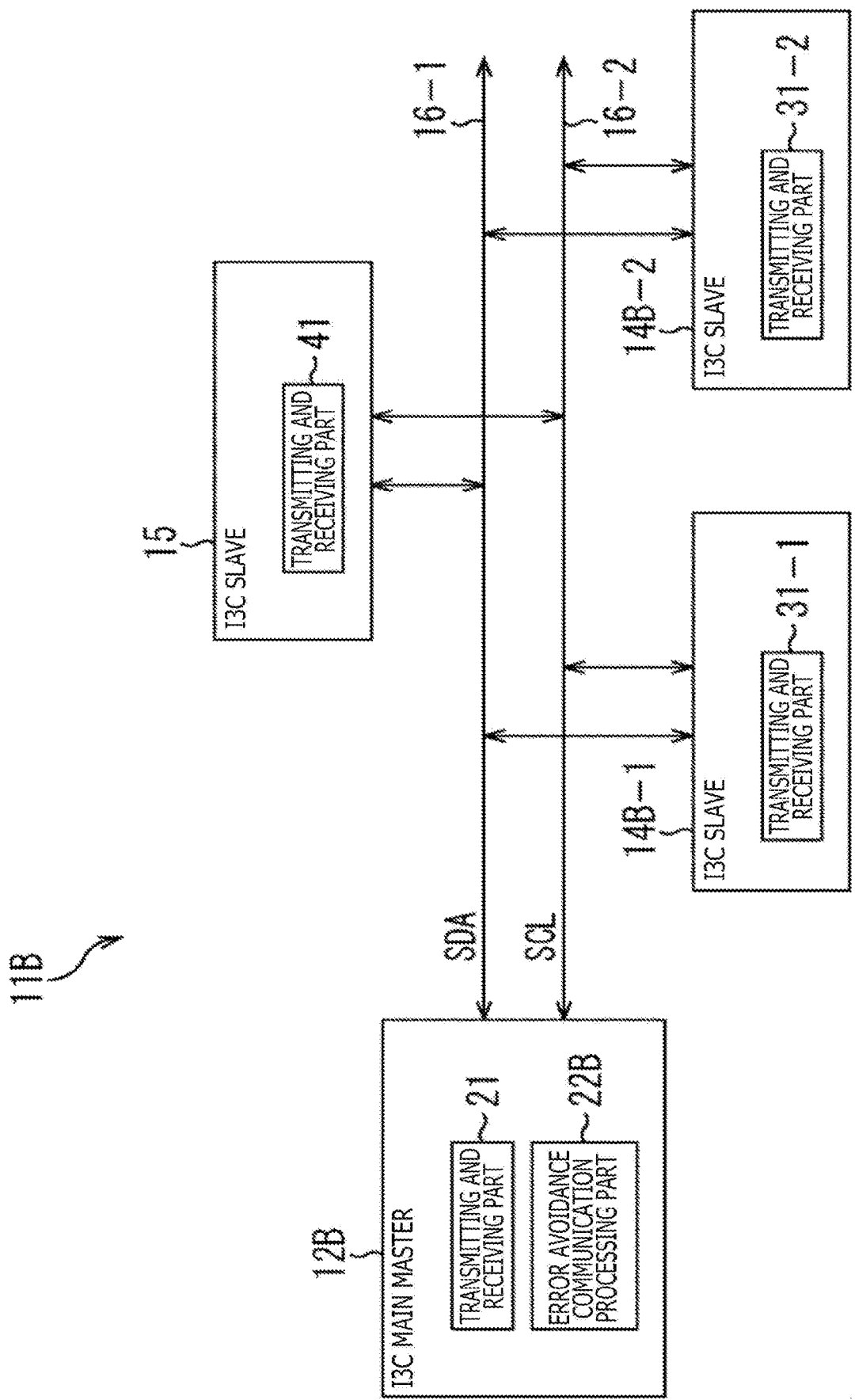
FIG. 10 is a block diagram depicting an example of a configuration of a third embodiment of the bus IF to which this technique is applied.

FIG. 10 is a block diagram depicting an example of a configuration of a third embodiment of the bus IF 11 to which this technique is applied.

A bus IF 11B depicted in FIG. 10 is configured by connecting an I3C main master 12B, I3C slaves 14B-1 and 14B-2, and an I2C slave 15 to each other through the data signal line 16-1 and the clock signal line 16-2. In addition, in the bus IF 11B, configurations common to those of the bus IF 11 in FIG. 3 are given the same reference numerals and will not again be described in detail.

In other words, the bus IF 11B has a configuration different from that of the bus IF 11 in FIG. 3 in a point that the I3C main master 12B includes an error avoidance communication processing part 22B that executes a process different from that of the error avoidance communication processing part 22 in FIG. 3 and the I3C slave 14B does not include the error avoidance connection processing part 32.

Moreover, the I3C slave 14B has the detection of the stop condition set therein as the condition for the counting starting point for the bus idling counter to start the counting, similar to the case described with reference to FIG. 2.

To avoid the deadlock of the I3C slave 14B, the error avoidance communication processing part 22B of the I3C main master 12B executes a process of instructing the transmitting and receiving part 21 to regularly issue an optional polling signal that includes the stop condition. In accordance with this instruction, the transmitting and receiving part 21 executes polling of regularly (for example, every 10 ms) transmitting the polling signal that does not adversely influence, for example, the control for the overall system of the bus IF 11B.

For example, a get-status (GETSTATUS) that is a common command code instructing to obtain the status of the device is usable as the polling signal. In addition, a get-PID (GETPID) that instructs to obtain information called "PID (Provisional ID)" of 48 bits (for example, a fixed value having the manufacturer's name of the device and the like described therein), a get-BCR (GETBCR) that instructs to obtain the BCR (Bus Characteristics Register) of the device, and the like may also be used.

As described with reference to B of FIG. 2 described above, even when the I3C slave 14 is connected at the timing at which any communication of the bus IF 11B is not executed, any deadlock of the I3C slave 14B is therefore avoided by regularly transmitting the polling signal. In other words, the I3C slave 14B connected to the bus IF 11B can start up the bus idling counter by detecting the stop condition included in the polling signal and can thereafter determine whether or not the bus IF 11B is in the idling state.

As above, in the bus IF 11B, the I3C main master 12B regularly issues the optional polling signal that includes the stop condition and the I3C slave 14B connected to the bus IF 11B can thereby reliably execute the hot join request. The I3C slave 14B supporting the hot join can thereby participate in the bus IF 11 and can reliably execute the communication.
<Example of Mounting of I3C Main Master and I3C Slave>

Figure 11:
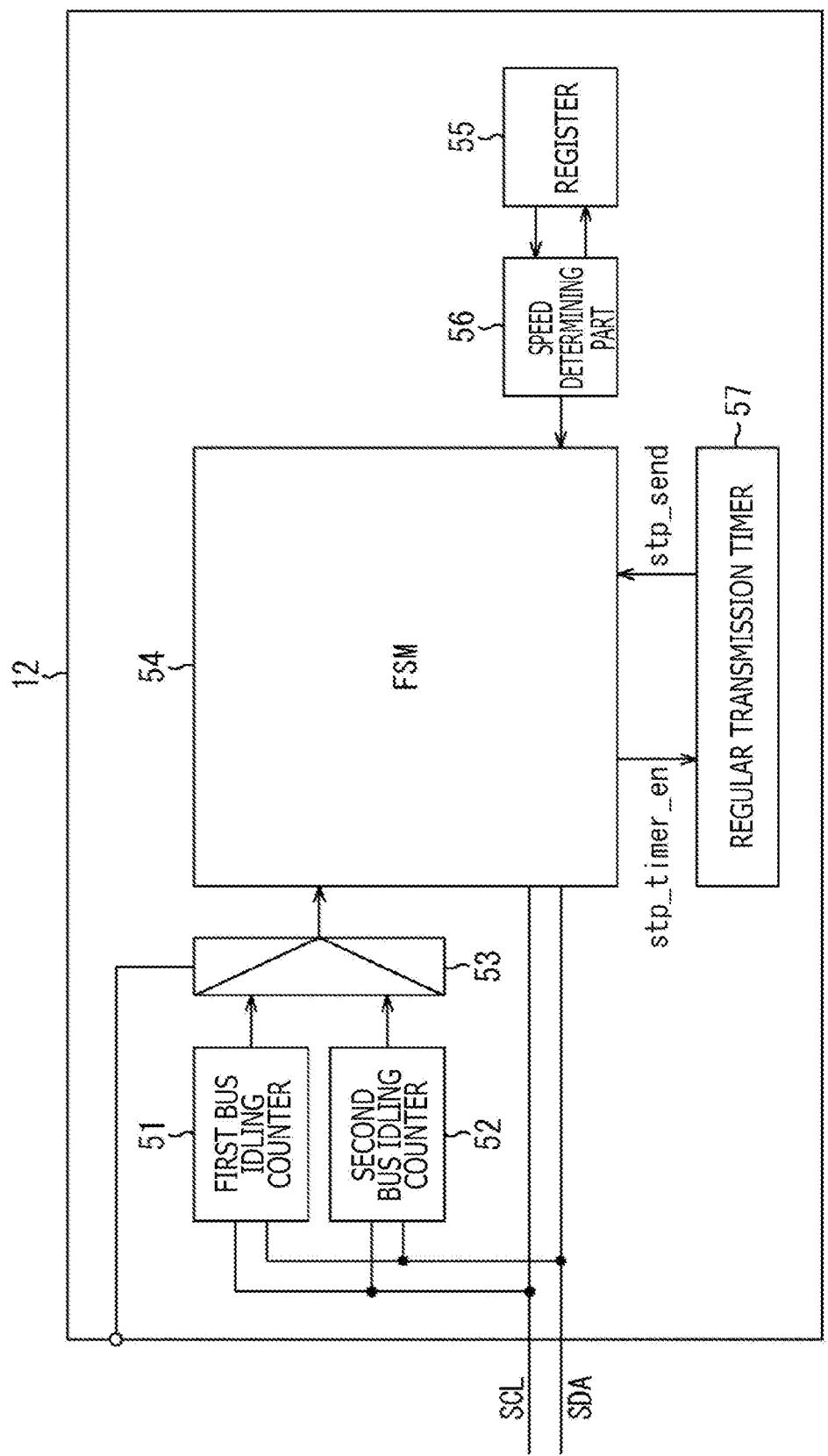
FIG. 11 is a diagram depicting an example of mounting of the I3C main master.

FIG. 11 is a block diagram depicting an example of mounting of the I3C main master 12.

As depicted in FIG. 11, the I3C main master 12 includes a first bus idling counter 51, a second bus idling counter 52, a selecting part 53, a FSM (Finite State Machine) 54, a register 55, a speed determining part 56, and a regular transmission timer 57. In addition, the register 55 and the speed determining part 56 do not need to be mounted as hardware.

Concerning the above, the I3C main master 12 depicted in FIG. 11 is configured to be able to operate as the I3C slave 14 supporting the hot join, similar to the I3C secondary master 13 in FIG. 1. The first bus idling counter 51, the second bus idling counter 52, and the selecting part 53 depicted in FIG. 11 are therefore driven only in a case where these components operate each as the I3C slave 14 supporting the hot join. The first bus idling counter 51, the second bus idling counter 52, and the selecting part 53 will be described later with reference to the I3C slave 14 depicted in FIG. 12 due to the above.

The data signal line 16-1 transmitting the serial data SDA and the clock signal line 16-2 transmitting the serial clock SCL are connected to the FSM 54. For example, the FSM 54 executes transmission and reception of signals by driving the data signal line 16-1 and the clock signal line 16-2 with FMS 54 of the I3C slave 14 depicted in FIG. 12.

The register 55 has various types of information recorded thereon to be used when the FSM 54 executes communication and, for example, has a speed instruction value recorded thereon that instructs the lower limit of the communication speed employed when communication is executed with the I2C slave 15 as described above with reference to FIG. 4.

The speed determining part 56 reads the speed instruction value from the register 55 and makes a setting in the FSM 54 such that the communication speed does not lower the lower limit of the communication speed instructed by the speed instruction value. The speed determining part 56 thereafter determines whether or not, when the I3C main master 12 executes communication with the I2C slave 15, the communication speed thereof lowers the lower limit. For example, in a case where the speed determining part 56 determines that the communication speed for the I2C slave 15 lowers the lower limit, the speed determining part 56 records in the register 55 information indicating occurrence of an error for the communication speed to lower the lower limit.

When the optional polling signal including the stop condition as described above with reference to FIG. 10 is regularly transmitted, the regular transmission timer 57 measures the time period as the regular interval and instructs the FSM 54 the timing to execute the transmission of the polling signal. For example, in a case where the I3C main master 12 is operated to regularly transmit the optional polling signal including the stop condition, the FSM 54 supplies to the regular transmission timer 57 a signal (stp_timer_en) that instructs validation of the measurement of the time period as the regular interval. In response to this, the regular transmission timer 57 supplies to the FSM 54 a signal (stp_send) that instructs transmission of the polling signal when the timing to transmit the polling signal comes.

The I3C main master 12 can be mounted as above and the I3C main master 12 can control the communication process executed by the bus IF 11 to avoid occurrence of any deadlock or any communication error as described above.

Figure 12:
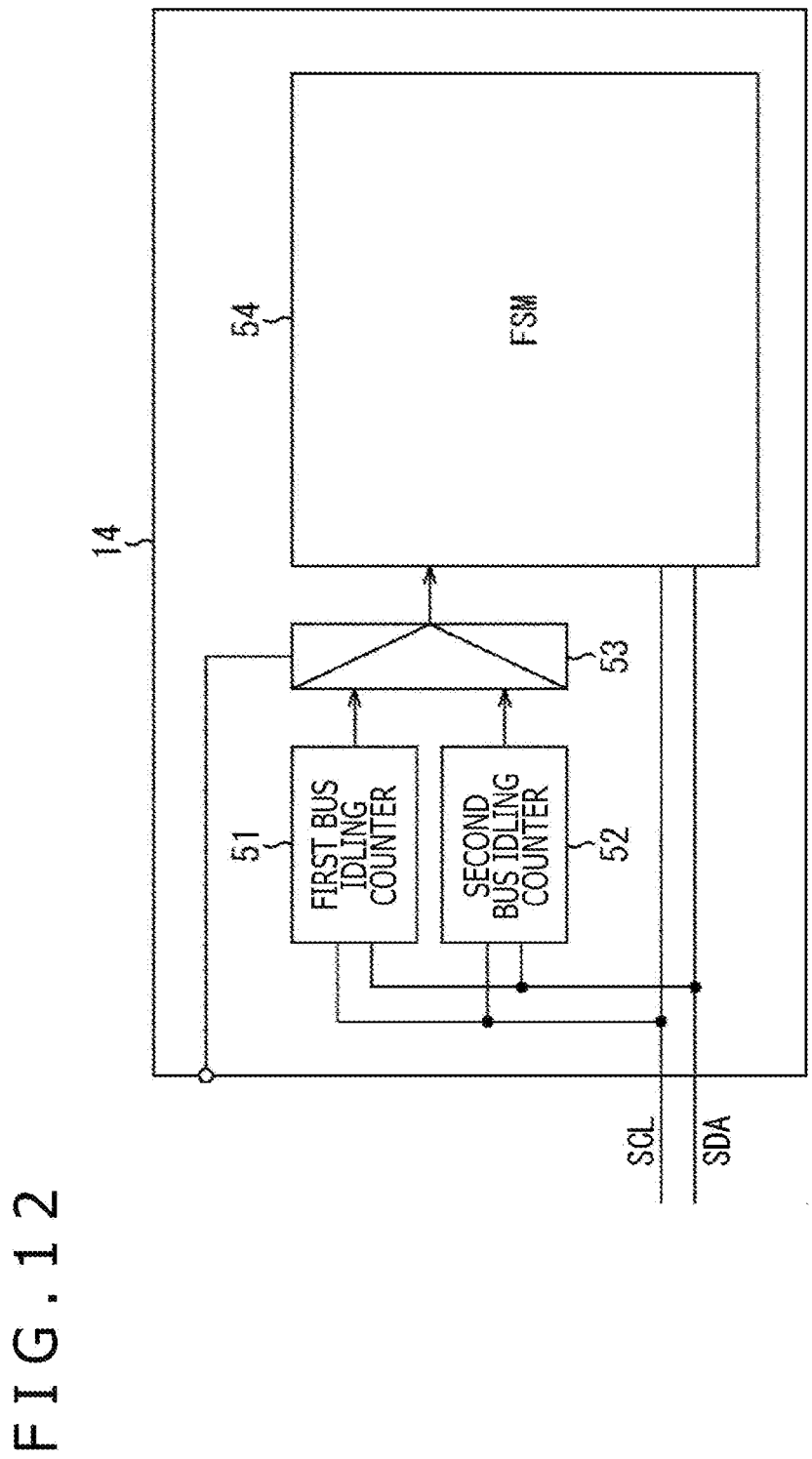
FIG. 12 is a diagram depicting an example of mounting of an I3C slave.

FIG. 12 is a block diagram depicting an example of mounting of an I3C slave 14.

As depicted in FIG. 12, the I3C slave 14 includes the first bus idling counter 51, the second bus idling counter 52, the selecting part 53, and the FSM 54.

The first bus idling counter 51 and the second bus idling counter 52 are each connected to the data signal line 16-1 and the clock signal line 16-2, and each execute counting to confirm that the bus IF 11 is in the idling state.

For example, the first bus idling counter 51 has the condition set therein for the counting starting point to start the counting when the stop condition is detected as described with reference to FIG. 2. The first bus idling counter 51 therefore starts the counting at the timing at which the stop condition is detected and, when the time period for the data signal line 16-1 and the clock signal line 16-2 to each be at the H-level continues for, for example, one ms, outputs a signal indicating this state. For example, the first bus idling counter 51 can detect the stop condition issued when the normal communication comes to an end or the stop condition included in the polling signal regularly transmitted by the regular transmission timer 57 in FIG. 11.

Moreover, as described with reference to FIG. 4, the second bus idling counter 52 has the condition set therein for the counting starting point to start the counting when the fact that the potentials of the data signal line 16-1 and the clock signal line 16-2 are each at the H-level is detected. The second bus idling counter 52 therefore starts the counting at the timing at which the fact that the potentials of the data signal line 16-1 and the clock signal line 16-2 are each at the H-level is detected and, when the time period for the state where the data signal line 16-1 and the clock signal line 16-2 are each at the H-level becomes, for example, one ms, outputs a signal indicating this state.

In accordance with the setting executed through an external terminal (for example, a setting using a pin), the selecting part 53 selects the output of either one of the first bus idling counter 51 and the second bus idling counter 52 and supplies this output to the FSM 54. In addition, the setting of the selection for the selecting part 53 can execute using, for example, a non-volatile memory in addition to the external terminal, and the setting by the register becomes invalid. This is because, for example, the setting for the selection in the selecting part 53 needs to be executed before the I3C main master 12 accesses the register.

The FSM 54 executes transmission and reception of signals by driving the data signal line 16-1 and the clock signal line 16-2 with the FSM 54 of the I3C main master 12 in FIG. 11. The FSM 54 thereafter switches the potential of the data signal line 16-1 from the H-level to the L-level and executes the hot join request when the I3C slave 14 is connected to the bus IF 11 and the signal output from the first bus idling counter 51 or the second bus idling counter 52 is supplied thereto through the selecting part 53.

The I3C slave 14 can be mounted as above and, when the first bus idling counter 51 detects the stop condition or, when the second bus idling counter 52 detects that the potentials of the data signal line 16-1 and the clock signal line 16-2 are each at the H-level, can execute the hot join request in response to either thereof. In addition, in a case where the configuration of the bus IF 11 is determined to be either one, the I3C slave 14 may include one of the first bus idling counter 51 and the second bus idling counter 52, in accordance with the determination.

For example, when the I3C slave 14 includes the first bus idling counter 51, the I3C slave 14 functions as the I3C slave 14B in FIG. 10 described above. On the other hand, when the I3C slave 14 includes the second bus idling counter 52, the I3C slave 14 functions as the I3C slave 14 in FIG. 3 or FIG. 7 described above.

Figure 13:
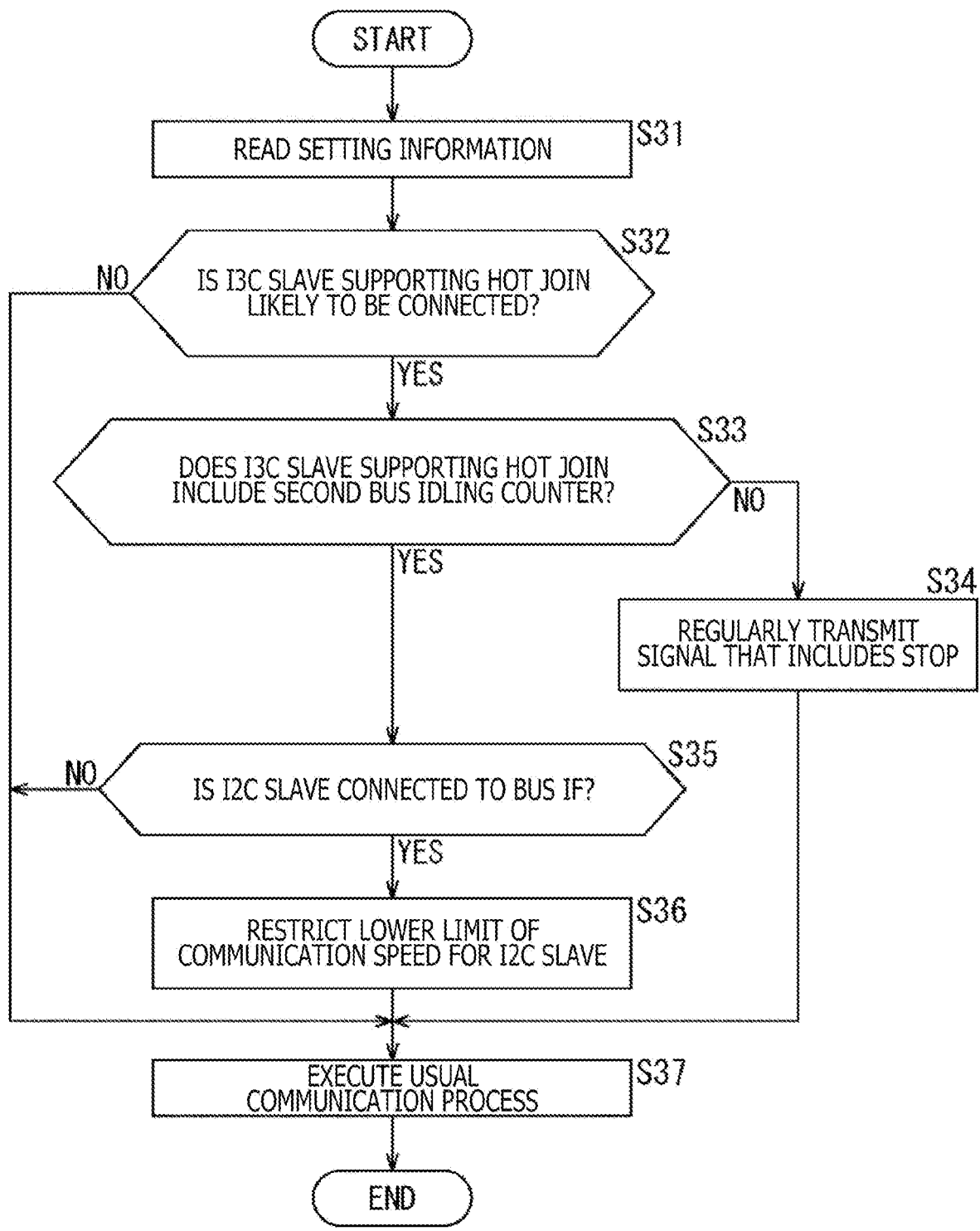
FIG. 13 is a flowchart illustrating processes executed by the I3C main master in FIG. 11.

The processes executed by the I3C main master 12 in FIG. 11 will be described with reference to FIG. 13.

For example, when the power source of the I3C main master 12 is turned on, the processes are started and, at step S31, the I3C main master 12 reads the setting information written in the firmware.

At step S32, the FSM 54 of the I3C main master 12 determines whether or not the I3C slave 14 supporting the hot join is likely to be connected to the bus IF 11, on the basis of the setting information read at step S31.

In a case where the FSM 54 of the I3C main master 12 determines at step S32 that the I3C slave 14 supporting the hot join is not likely to be connected to the bus IF 11, the process advances to step S37 and the usual communication process is executed. In other words, in this case, the communication process is executed without occurrence of any deadlock or any communication error associated with the hot join of the I3C slave 14.

On the other hand, in a case where the FSM 54 of the I3C main master 12 determines at step S32 that the I3C slave 14 supporting the hot join is likely to be connected to the bus IF 11, the process advances to step S33.

At step S33, the FSM 54 of the I3C main master 12 determines whether or not the I3C slave 14 supporting the hot join, that is likely to be connected to the bus IF 11 includes the second bus idling counter 52 depicted in FIG. 12. In addition, the setting information necessary for executing this determination is also written in advance in the firmware of the I3C main master 12 by the system designing engineer.

In a case where it is determined at step S33 that the I3C slave 14 supporting the hot join that is likely to be connected to the bus IF 11 does not include the second bus idling counter 52 depicted in FIG. 12, the process advances to step S34. In other words, in this case, this I3C slave 14 employs the detection of the stop condition by the first bus idling counter 51 as the condition for the starting point for the counting. The I3C slave 14 that is likely to be connected to the bus IF 11 needs to avoid occurrence of its deadlock because it is assumed that this I3C slave 14 does not include the error avoidance connection processing part 32 like the I3C slave 14B depicted in FIG. 10 described above.

At step S34, the FSM 54 of the I3C main master 12 makes the setting to regularly transmit the optional polling signal that includes the stop condition. For example, the FSM 54 of the I3C main master 12 supplies the signal (stp_timer_en) that instructs that the measurement of the time period of the regular interval is validated, to the regular transmission timer 57. The process thereafter advances to step S37 and, in this case, transmission of the polling signal is regularly executed in the usual communication process.

On the other hand, in a case where it is determined at step S33 that the I3C slave 14 supporting the hot join that is likely to be connected to the bus IF 11 includes the second bus idling counter 52 depicted in FIG. 12, the process advances to step S35.

At step S35, the FSM 54 of the I3C main master 12 determines whether or not the I2C slave 15 is connected to the bus IF 11, on the basis of the setting information read at step S31.

In a case where the FSM 54 of the I3C main master 12 determines at step S35 that the I2C slave 15 is not connected to the bus IF 11, the process advances to step S37 and the usual communication process is executed. In other words, in this case, the bus IF 11 can execute the communication process without any execution of the unintended hot join request described above with reference to FIG. 4.

On the other hand, in a case where the FSM 54 of the I3C main master 12 determines at step S35 that the I2C slave 15 is connected to the bus IF 11, the process advances to step S36. In other words, in this case, the bus IF 11 needs to avoid any occurrence of the deadlock as described above with reference to FIG. 2.

At step S36, the FSM 54 of the I3C main master 12 restrict the lower limit of the communication speed for the I2C slave 15 connected to the bus IF 11. For example, the speed determining part 56 reads the speed instruction value from the register 55 and set this value in the FSM 54, and the FSM 54 can thereby restricts the lower limit to establish the communication speed in accordance with the instruction by the speed instruction value.

After the process at step S36, the process advances to step S37 and the FSM 54 of the I3C main master 12 executes the usual communication process such that the communication speed does not lower the lower limit of the communication speed set at step S36.

As above, the I3C main master 12 can avoid occurrence of any deadlock, any communication error, and the like and can reliably execute the communication process, on the basis of the devices currently connected to the bus IF 11 or the device that is likely to be connected to the bus IF 11. In other words, the I3C main master 12 can execute the function as the error avoidance communication processing part 22 in FIG. 3 or the error avoidance communication processing part 22B in FIG. 10 using the FSM 54, the speed determining part 56, and the regular transmission timer 57.

In addition, this technique is not limited to the bus IF 11 that complies with the standard of the I3C, and is applicable to a bus IF 11 that complies with another standard. Moreover, the types and the quantity of the devices connected to the bus IF 11 are not limited to those in, for example, the example of the configuration as depicted in FIG. 1.

<Example of Configuration of Computer>

Concerning the above, the processes described with reference to the flowcharts described above do not necessarily need to be chronologically processed in accordance with the order described as the flowcharts, and include processes to be executed in parallel to each other or to each be individually executed (for example, parallel processes or processes each by an object). Moreover, the program may be the one to be processed by one single CPU or may be the one to be distributed-processed by plural CPUs.

Moreover, the above series of processes (an information processing method) are executable by hardware or executable by software. In a case where the series of processes are executed by software, the program constituting the software is installed from a program recording medium having the program recorded thereon to a computer incorporated in the dedicated hardware or a personal computer that can execute various types of function by installing various types of programs therein for example, a general-purpose personal computer.

Figure 14:
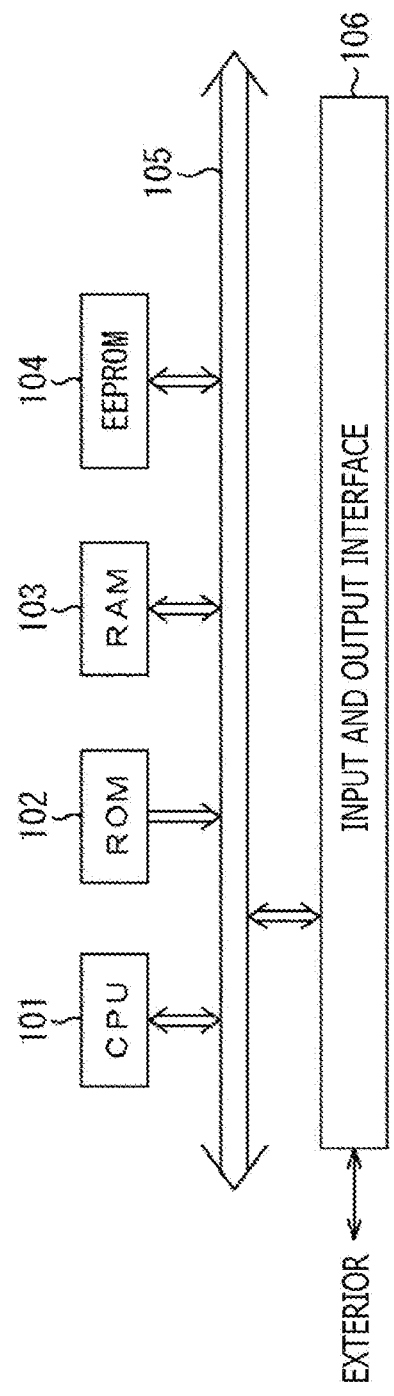
FIG. 14 is a block diagram depicting an example of a configuration of an embodiment of a computer to which this technique is applied.

FIG. 14 is a block diagram depicting an example of the configuration of the hardware of a computer that executes the above series of processes in accordance with programs.

In the computer, a CPU (Central Processing Unit) 101, a ROM (Read Only Memory) 102, a RAM (Random Access Memory) 103, and an EEPROM (Electronically Erasable and Programmable Read Only Memory) 104 are mutually connected to each other by a bus 105. The bus 105 is further connected to an input and output interface 106, and the input and output interface 106 is connected to the exterior.

In the computer configured as above, for example, the CPU 101 downloads programs stored in the ROM 102 and the EEPROM 104 to RAM 103 through the bus 105 and executes the programs, and the above series of processes are thereby executed. Moreover, the programs executed by the computer (the CPU 101) can be written in advance in the ROM 102 or, in addition, can be installed into the EEPROM 104 and updated therein from the exterior through the input and output interface 105.

<Example of Combination of Configuration>

In addition, this technique can also take the following configurations.

(1)

A communicating apparatus including:

a transmitting and receiving part that executes transmission and reception of signals with at least one or more other communicating apparatuses; and an error avoiding part that, in a state where a communication system configured to be able to execute communication through a bus already operates, executes a process of avoiding occurrence of any error occurring when a communicating apparatus is additionally connected to the communication system.

(2)

The communicating apparatus according to (1) described above, in which the communicating apparatus includes a second communicating apparatus that executes communication in accordance with control by a first communicating apparatus having the initiative of the communication through the bus, and is additionally connected to the communication system, the transmitting and receiving part executes transmission and reception of signals with the other communicating apparatus through a data signal line and a clock signal line constituting the bus, and the error avoiding part causes the transmitting and receiving part to transmit a signal requesting additional connection to the communication system when the error avoiding part detects that a state where potentials of the data signal line and the clock signal line are each at an H-level continues for a time period longer than a predetermined time period, using detection of a fact that the potentials of the data signal line and the clock signal line are each at an H-level as a condition for starting counting.

(3)

The communicating apparatus according to (2) described above, the communicating apparatus includes a first communicating apparatus having the initiative of communication through the bus, in which in a case where the second communicating apparatus is likely to be additionally connected to the communication system, the error avoiding part restricts the lower limit of the communication speed employed when communication is executed with a low-speed communicating apparatus that is a communicating apparatus executing communication at a speed lower than the communication speed employed in the communication of the second communicating apparatus.

(4)

The communicating apparatus according to (3) described above, in which the first communicating apparatus has information set in advance therein that indicates whether or not the second communicating apparatus is likely to be additionally connected to the communication system.

(5)

The communicating apparatus according to any one of (1) to (4) described above, in which a first communicating apparatus that has the initiative of communication through the bus, and the error avoiding part causes the transmitting and receiving part to regularly transmit an optional polling signal that includes an end signal declaring the end of the communication in the bus.

(6)

The communicating apparatus according to any one of (1) to (5) described above, in which the communicating apparatus includes a first communicating apparatus that has the initiative of communication through the bus, the transmitting and receiving part executes transmission and reception of signals with the other communicating apparatus through the data signal line and the clock signal line constituting the bus, and the error avoiding part, in a case where the second communicating apparatus to be additionally connected to the communication system does not include any counting part that counts with the detection of the fact that the potentials of the data signal line and the clock signal line are each at the H-level as the start of the counting, causes the transmitting and receiving part to regularly transmit the optional polling signal including an end signal that declares the end of the communication in the bus, and in a case where the second communicating apparatus to be additionally connected to the communication system includes a counting part that counts with the detection of the fact that the potentials of the data signal line and the clock signal line are each at the H-level, as the start of the counting and the low-speed communicating apparatus includes a communicating apparatus executing communication at a speed lower than the communication speed employed in the communication of the second communicating apparatus is connected to the communication system, restricts the lower limit of the communication speed employed when communication is executed with the low-speed communicating apparatus.

(7)

A communication method including the steps of:

executing transmission and reception of signals with at least one or more other communicating apparatuses; and in the state where a communication system configured to be able to execute communication through a bus already operates, executing a process of avoiding occurrence of any error occurring when a communicating apparatus is additionally connected to the communication system.

(8)

A program causing a computer to execute a process that includes the steps of:

executing transmission and reception of signals with at least one or more other communicating apparatuses; and in a state where a communication system configured to be able to execute communication through a bus already operates, executing a process of avoiding occurrence of any error occurring when a communicating apparatus is additionally connected to the communication system.

(9)

A communication system configured to be able to execute communication through the bus using a first communicating apparatus that has the initiative of communication through the bus and a second communicating apparatus that executes communication in accordance with control by the first communicating apparatus, in which the first communicating apparatus and the second communicating apparatus each include a transmitting and receiving part that executes transmission and reception of signals with at least one or more other communicating apparatuses, and at least one of the first communicating apparatus or the second communicating apparatus includes an error avoiding part that, in the state where the first communicating apparatus is connected to at least the bus and the communication system already operates, executes a process of avoiding occurrence of any error occurring when the second communicating apparatus is additionally connected to the communication system.

In addition, this embodiment is not limited to the above embodiments and various changes can be made thereto within the scope not departing from the gist of this disclosure.

REFERENCE SIGNS LIST

11 Bus IF, 12 I3C Main master, 13 I3C Secondary master, 14 I3C Slave, 15 I2C Slave, 16-1 Data signal line, 16-2 Clock signal line, 21 Transmitting and receiving part, 22 Error avoidance communication processing part, 31 Transmitting and receiving part, 32 Error avoidance connection processing part, 41 Transmitting and receiving part, 51 First bus idling counter, 52 Second bus idling counter, 53 Selecting part, 54 FSM, 55 Register, 56 Speed determining part, 57 Regular transmission timer

The invention claimed is:

1. A communicating apparatus comprising:

a transmitting and receiving part configured to execute transmission and reception of signals with at least one or more other communicating apparatuses through a bus, the bus including a data signal line and a dock signal line; and an error avoiding part configured to execute a process of avoiding occurrence of a detection error, wherein the detection error is an error wherein the communicating apparatus is additionally connected to the bus, but is not detected by at least one of the other communicating apparatuses that has initiative of communication through the bus, and the error avoiding part causes the transmitting and receiving part to transmit a signal requesting additional connection to the bus when the error avoiding part detects that a state where potentials of the data signal line and the clock signal line are each at an H-level continues for a time period longer than a predetermined time period, using a fact that the error avoiding part detects that the potentials of the data signal line and the clock signal line are each at an H-level, as a condition for starting counting.

2. The communicating apparatus according to claim 1, wherein the error avoiding part is configured to execute the process of avoiding occurrence of the detection error after the bus is already configured.

3. The communicating apparatus according to claim 1, wherein when the communicating apparatus has initiative of communication through the bus, in a case where an other communicating apparatus is likely to be additionally connected to the bus, the error avoiding part restricts a lower limit of a communication speed employed when communication is executed with a low-speed communicating apparatus that executes communication at a speed lower than a communication speed employed in the communication of the other communicating apparatus.

4. The communicating apparatus according to claim 3, wherein the communicating apparatus has information set in advance therein that indicates whether or not the other communicating apparatus is likely to be additionally connected to the bus.

5. The communicating apparatus according to claim 1, wherein when the communicating apparatus is configured to have initiative of communication through the bus, the error avoiding part causes the transmitting and receiving part to regularly transmit an optional polling signal that includes an end signal declaring an end of the communication using the bus.

6. The communicating apparatus according to claim 1, wherein the communicating apparatus includes a first communicating apparatus that has initiative of communication through the bus, the transmitting and receiving part executes transmission and reception of signals with the other communicating apparatuses through the data signal line and the clock signal line that constitute the bus, and the error avoiding part in a case where a second communicating apparatus to be additionally connected to the bus does not include a counting part that counts with the detection of the fact that potentials of the data signal line and the clock signal line are each at an H-level as a start of counting, causes the transmitting and receiving part to regularly transmit an optional polling signal including an end signal that declares an end of the communication using the bus, and in a case where the second communicating apparatus to be additionally connected to the bus includes the counting part that counts with the detection of the fact that the potentials of the data signal line and the clock signal line are each at the H-level as the start of the counting and a low-speed communicating apparatus includes a communicating apparatus executing communication at a speed lower than a communication speed employed in the communication of the second communicating apparatus is connected to the bus, restricts a lower limit of the communication speed employed when communication is executed with the low-speed communicating apparatus.

7. A communication method for a communicating apparatus, the method comprising:

accessing a transmitting and receiving part that is configured to execute transmission and reception of signals with at least one or more other communicating apparatuses through a bus, the bus including a data signal line and a clock signal line; and executing, by an error avoiding part, a process of avoiding occurrence of a detection error, wherein the detection error is an error wherein the communicating apparatus is additionally connected to the bus, but is not detected by at least one of the other communicating apparatuses that has initiative of communication through the bus, and the error avoiding part causes the transmitting and receiving part to transmit a signal requesting additional connection to the bus when the error avoiding part detects that a state where potentials of the data signal line and the clock signal line are each at an H-level continues for a time period longer than a predetermined time period, using a fact that the error avoiding part detects that the potentials of the data signal line and the clock signal line are each at an H-level, as a condition for starting counting.

8. A non-transitory computer readable medium storing program code for controlling a communicating apparatus, the program code being executable by a computer to perform operations comprising:

accessing a transmitting and receiving part that is configured to execute transmission and reception of signals with at least one or more other communicating apparatuses through a bus, the bus including a data signal line and a clock signal line; and executing, by an error avoiding part, a process of avoiding occurrence of a detection error, wherein the detection error is an error wherein the communicating apparatus is additionally connected to the bus, but is not detected by at least one of the other communicating apparatuses that has initiative of communication through the bus, and the error avoiding part causes the transmitting and receiving part to transmit a signal requesting additional connection to the bus when the error avoiding part detects that a state where potentials of the data signal line and the clock signal line are each at an H-level continues for a time period longer than a predetermined time period, using a fact that the error avoiding part detects that the potentials of the data signal line and the clock signal line are each at an H-level, as a condition for starting counting.

9. A communication system configured to be able to execute communication through a bus using a first communicating apparatus that has initiative of communication through the bus and a second communicating apparatus that executes communication in accordance with control by the first communicating apparatus, wherein the first communicating apparatus and the second communicating apparatus each include a transmitting and receiving part that executes transmission and reception of signals with at least one or more other communicating apparatuses using the bus, the bus including a data signal line and a clock signal line, and at least one of the first communicating apparatus or the second communicating apparatus include an error avoiding part that executes a process of avoiding occurrence of a detection error, wherein the detection error is an error wherein the second communicating apparatus is additionally connected to the bus, but is not detected by the first communicating apparatus, and the error avoiding part causes the transmitting and receiving part to transmit a signal requesting additional connection to the bus when the error avoiding part detects that a state where potentials of the data signal line and the clock signal line are each at an H-level continues for a time period longer than a predetermined time period, using a fact that the error avoiding part detects that the potentials of the data signal line and the clock signal line are each at an H-level as a condition for starting counting.

10. The communicating method according to claim 7, wherein the error avoiding part is configured to execute the process of avoiding occurrence of the detection error after the bus is already configured.

11. The communicating method according to claim 7, wherein when the communicating apparatus has initiative of communication through the bus, in a case where another communicating apparatus is likely to be additionally connected to the bus, the process of avoiding occurrence of the detection error restricts a lower limit of a communication speed employed when communication is executed with a low-speed communicating apparatus that executes communication at a speed lower than a communication speed employed in the communication of the other communicating apparatus.

12. The communicating method according to claim 11, wherein the communicating apparatus has information set in advance therein that indicates whether or not the other communicating apparatus is likely to be additionally connected to the bus.

13. The communicating method according to claim 7, wherein
when the communicating apparatus is configured to have initiative of communication through the bus,
the process of avoiding occurrence of the detection error causes the transmitting and receiving part to regularly transmit an optional polling signal that includes an end signal declaring an end of the communication using the bus.

14. The non-transitory computer readable medium according to claim 8, wherein
the error avoiding part is configured to execute the process of avoiding occurrence of the detection error after the bus is already configured.

15. The non-transitory computer readable medium according to claim 8, wherein
when the communicating apparatus has initiative of communication through the bus,
in a case where another communicating apparatus is likely to be additionally connected to the bus, the process of avoiding occurrence of the detection error restricts a lower limit of a communication speed employed when communication is executed with a low-speed communicating apparatus that executes communication at a speed lower than a communication speed employed in the communication of the other communicating apparatus.

16. The non-transitory computer readable medium according to claim 15, wherein
the communicating apparatus has information set in advance therein that indicates whether or not the other communicating apparatus is likely to be additionally connected to the bus.

17. The non-transitory computer readable medium according to claim 8, wherein
when the communicating apparatus is configured to have initiative of communication through the bus,
the process of avoiding occurrence of the detection error causes the transmitting and receiving part to regularly transmit an optional polling signal that includes an end signal declaring an end of the communication using the bus.

* * * * *